(12) United States Patent
Asobe et al.

(10) Patent No.: US 6,806,986 B2
(45) Date of Patent: Oct. 19, 2004

(54) WAVELENGTH CONVERTER AND WAVELENGTH CONVERTING APPARATUS

(75) Inventors: Masaki Asobe, Isehara (JP); Osamu Tadanaga, Zama (JP); Hiroshi Miyazawa, Isehara (JP); Yoshiki Nishida, Mito (JP); Hiroyuki Suzuki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/456,073

(22) Filed: Jun. 6, 2003

(65) Prior Publication Data

US 2003/0231890 A1 Dec. 18, 2003

(30) Foreign Application Priority Data

Jun. 14, 2002 (JP) ........................................ 2002-174938
Jan. 29, 2003 (JP) ........................................ 2003-020560

(51) Int. Cl.[7] .............................. G02F 1/01; G02F 1/11; G02B 6/00
(52) U.S. Cl. ........................ 359/238; 359/285; 359/287; 385/122
(58) Field of Search ................................ 359/238, 285, 359/286, 287; 385/122, 4, 7, 11, 32

(56) References Cited

U.S. PATENT DOCUMENTS 5,157,754 A * 10/1992 Bierlein et al. ............. 385/122
5,557,699 A * 9/1996 Kester et al. ............... 385/122

FOREIGN PATENT DOCUMENTS

GB 2 347 520 A 9/2000

OTHER PUBLICATIONS

Moshe Nazarathy and D. W. Dolfi, *Spread–Spectrum Non-linear–Optical Interactions: Quasi–Phase Matching with Pseudorandom Polarity Reversals*, Optical Letters, vol. 12, No. 10, Oct. 1987, pp. 823–825.

Toshiaki Suhara and Hiroshi Nishihara, *Theoretical Analysis of Waveguide Second–Harmonic Generation Phase Matched with Uniform and Chirped Gratings*, IEEE Journal of Quantum Electronics, No. 7, Jul. 26, 1990, pp. 1265–1276.

(List continued on next page.)

Primary Examiner—Timothy Thompson
(74) Attorney, Agent, or Firm—Workman Nydegger

(57) ABSTRACT

A wavelength converter has a phase modulated periodically modulated structure, where a nonlinear optical coefficient is periodically modulated at a fundamental period $\Lambda_0$ and the phase of the modulation varies nearly continuously, and the phase variation of the modulation unit structure is repeated at a period $\Lambda_{ph}$ ($>\Lambda_0$). A conversion efficiency is made maximum when a phase mismatch amount $\Delta\beta$ equals $2\pi/\Lambda_0 \pm 2\pi i/\Lambda_{ph}$ (i=0, 1, ..., n, where n is a positive integer), $2\pi/\Lambda_0 \pm 2\pi(2i+1)/\Lambda_{ph}$ (i=0, 1, ..., n), or $2\pi/\Lambda_0 + 2\pi i/\Lambda_f$ (i=m, m+1, .... n, where m and n are positive or negative integers satisfying $|m| \neq |n|$), thereby providing a wavelength converter and wavelength converting apparatus that can be designed to be able to cope with a desired number of pump wavelengths, prevent the reduction in the conversion efficiency, and be configured easily using a practical size of a nonlinear optical material.

16 Claims, 18 Drawing Sheets

OTHER PUBLICATIONS

Martin M. Fejer et al., *Quasi–Phase–Matched Second Harmonic Generation : Tuning and Tolerances*, IEEE Journal of Quantum Electronics, vol. 28, No. 11, Nov. 1992, pp. 2631–2654.

G. Imeshev et al., *Engineerable Femtosecond Pulse Shaping by Second–Harmonic Generation with Fourier Synthetic Quasi–Phase–Matching Gratings*, Optics Letters, vol. 23, No. 11, Jun. 1, 1998, pp. 864–866.

Ole Bang et al., *Effective Nonlinearities and Multi–Wavelength Second–Harmonic Generation in Modulated Quasi–Phase–Matching Gratings*, Conference on Nonlinear Optics: Materials, Fundamentals and Applications, Technical Digest, Tops vol. 46, Aug. 6–10, 2000, pp. 162–164.

M.H. Chou et al., *Multiple–Channel Wavelength Conversion by Use of Engineered Quasi–Phase–Matching Structures in $LiNbO_3$ Waveguides*, Optics Letters, vol. 24, No. 16, Aug. 15, 1999, pp. 1157–1159.

M.H. Chou et al., *1.5–$\mu$m–band Wavelength Conversion Based on Difference–Frequency Generation in $LiNbO_3$ Waveguides with Integrated Coupling Structures*, Optics Letter, vol. 23, No. 13, Jul. 1, 1998, pp. 1004–1006.

Y.W. Lee et al., *Nonlinear Multiwavelength Conversion Based on an Aperiodic Optical Superlattice in Lithium Niobate*, Optics Letters, vol. 27, No.24, Dec. 15, 2002, pp. 2191–2193.

\* cited by examiner

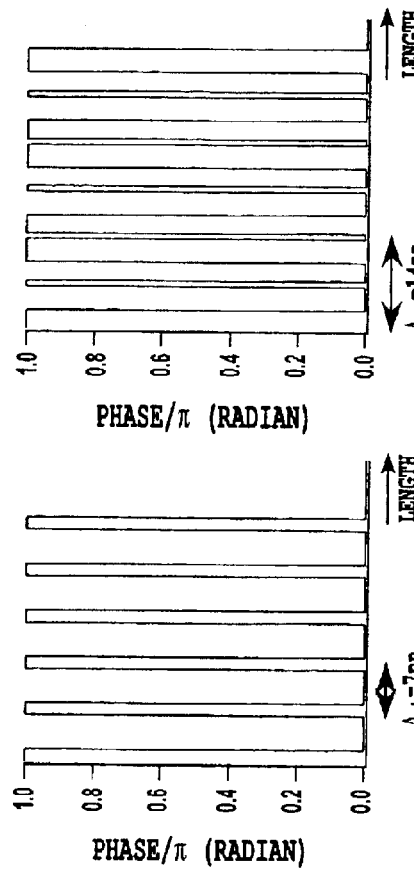
FIG.3A PRIOR ART
FIG.3C PRIOR ART
FIG.3E PRIOR ART
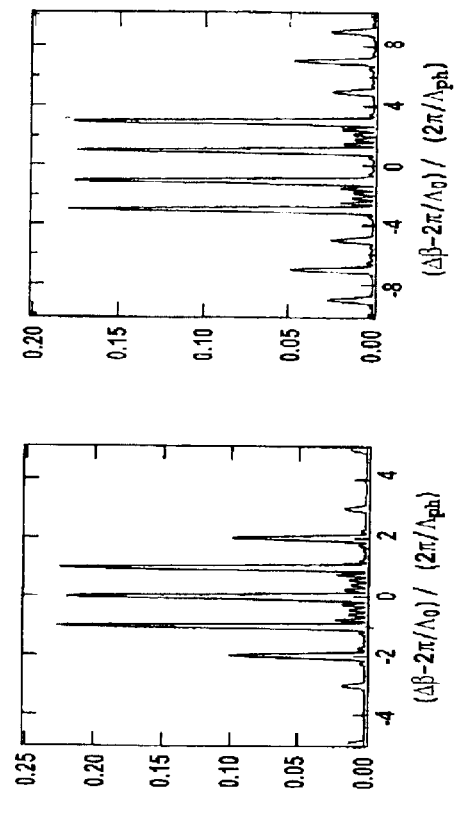
FIG.3B PRIOR ART
FIG.3D PRIOR ART
FIG.3F PRIOR ART

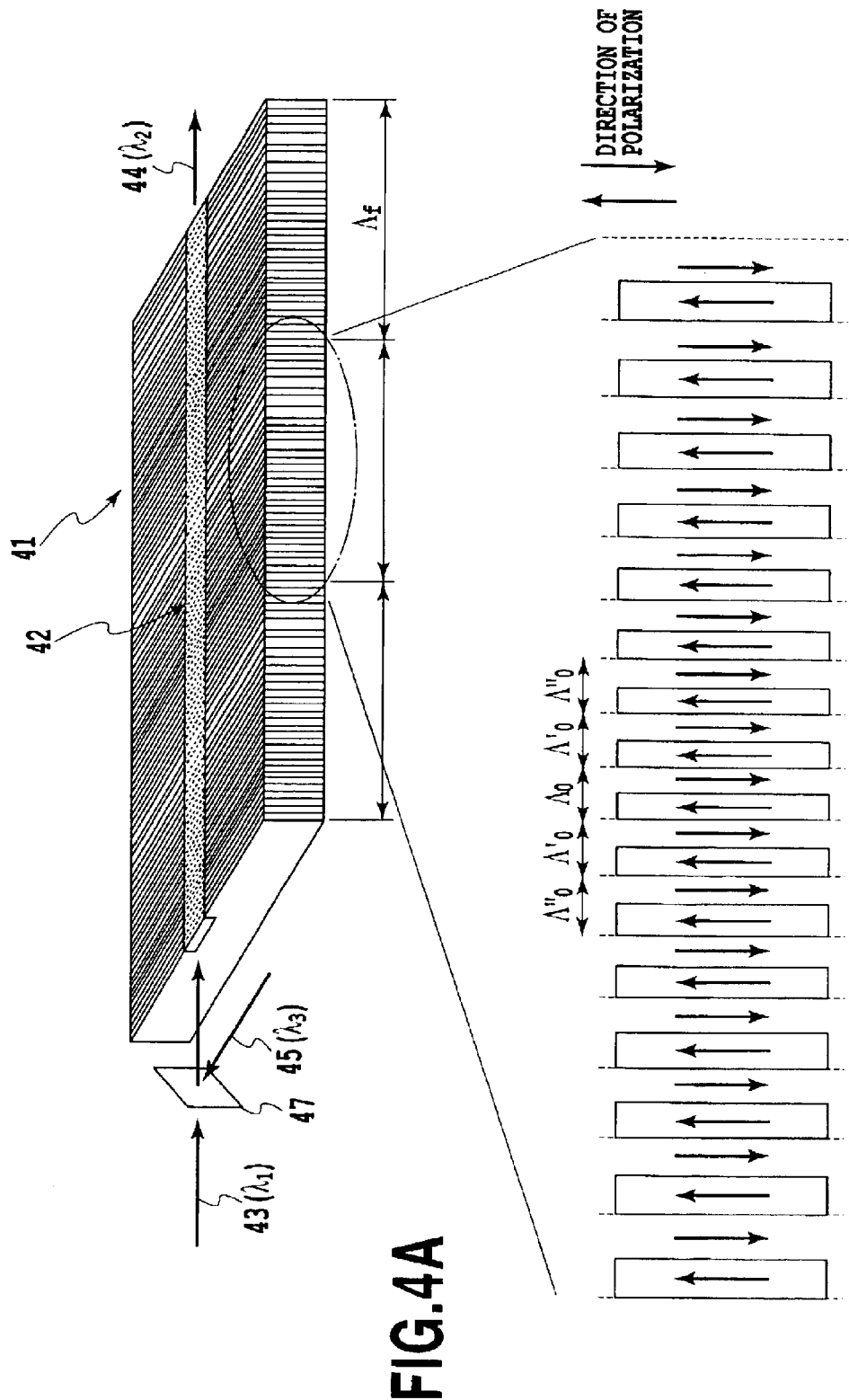

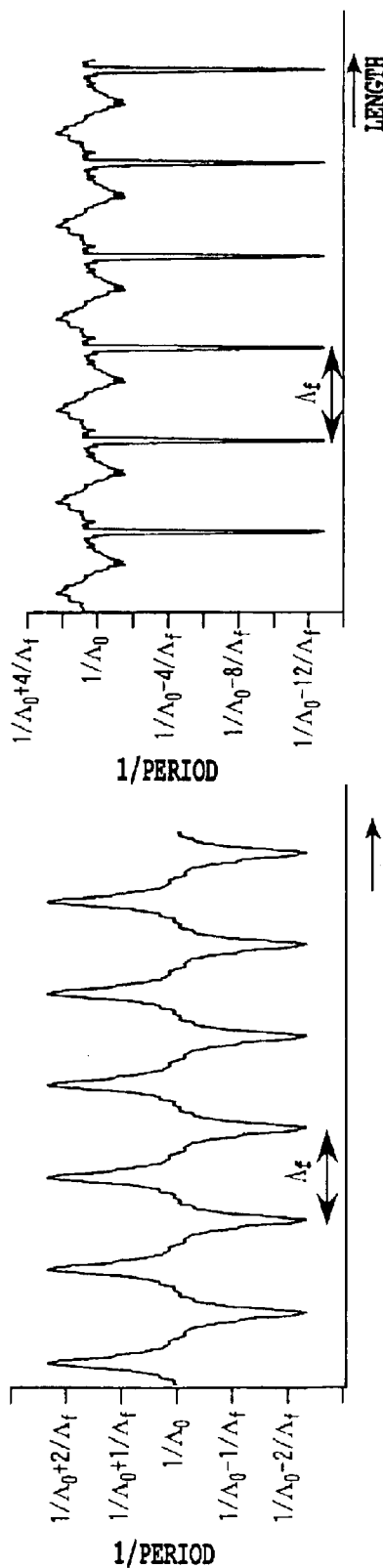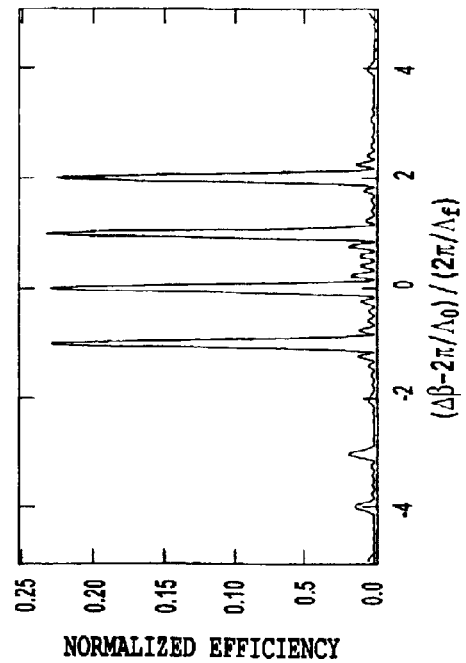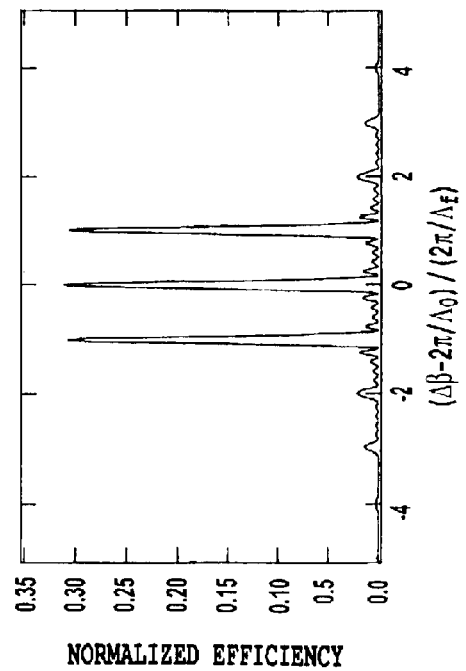
FIG.5A  FIG.5B  FIG.5C  FIG.5D

WAVELENGTH CONVERTER AND WAVELENGTH CONVERTING APPARATUS

This application claims priority from Japanese Patent Application Nos. 2002-174938 filed Jun. 14, 2002 and 2003-020560 filed Jan. 29, 2003, which are incorporated hereinto by reference.

BACKGROUND OF THE INVENTION

1. Field of the Invention

The present invention relates to a wavelength converter and a wavelength converting apparatus, and more particularly to a wavelength converter and a pump wavelength variable type wavelength converting apparatus that can be designed to handle a given number of pump wavelengths, can prevent reduction in a conversion efficiency, and can be simply configured using a practical size nonlinear optical material.

2. Description of the Related Art

Conventionally, wavelength converters and wavelength converting apparatuses configured using them have been known utilizing a variety of second order nonlinear optical effects. For example, a second harmonic generation apparatus can convert incident light to light (second harmonics) with half the original wavelength (twice the frequency). A sum frequency generation apparatus can convert two light beams with different wavelengths into a light beam with a frequency corresponding to the sum frequency of the two frequencies.

On the other hand, difference frequency generation apparatus can convert two light beams with different wavelengths into a light beam with a frequency corresponding to the difference frequency between the two frequencies. In addition, when one of the incident light beams is larger enough than the other of them, it can be configured as an optical amplifier that amplifies the intensity of the incident light utilizing a parametric effect. It is also applicable as a wavelength tunable light source by configuring a parametric resonator utilizing the parametric effect.

Next, the operation principle of conventional wavelength converters will be described briefly by way of example of difference frequency generators utilizing the second order nonlinear optical effect. These converters convert signal light with a wavelength $\lambda_1$ to idler light with a wavelength $\lambda_2$ by launching the signal light to a nonlinear optical medium pumped by pump light with a wavelength $\lambda_3$. The following equation is capable of coping with the three wavelengths, including the case where $\lambda_1 = \lambda_2$.

$$\frac{1}{\lambda_3} = \frac{1}{\lambda_1} + \frac{1}{\lambda_2} \quad (1)$$

Research and development of various materials have been conducted as nonlinear optical media capable of coping with such elements. As for element structures, the so-called "quasi-phase match type structure" is considered to be promising as reported by M. H. Chou, et al., (Optics Letters, Vol. 23, p. 1004 (1998)), for example. It has a structure that causes a second order nonlinear optical material such as $LiNbO_3$ to vary (modulate) its nonlinear optical coefficient periodically at a uniform period.

FIGS. 1A and 1B are diagrams for explaining a conventional wavelength converter (difference frequency generator) utilizing the second order nonlinear optical effect: FIG. 1A is a diagram illustrating a configuration of the wavelength converter conceptually; and FIG. 1B is a diagram illustrating the dependence of a conversion efficiency on a phase mismatch amount. To create a quasi-phase match type structure in a second order nonlinear optical material, the following methods are conceivable: First, a method of carrying out periodical modulation by spatially, alternately reversing the sign of the nonlinear optical coefficient of the material; second, a method of carrying out the periodical modulation by alternately placing sections with large and small nonlinear optical coefficients.

As for a ferroelectric crystal such as $LiNbO_3$, the sign of the nonlinear optical coefficient (d constant) corresponds to the polarity of the spontaneous polarization. Thus, in the wavelength converter shown in FIG. 1A, an optical waveguide 12 is formed in a nonlinear optical medium, a $LiNbO_3$ substrate 11, by a proton exchange method to periodically reversing the spontaneous polarization of the $LiNbO_3$ at a modulation period (modulation period of the nonlinear optical coefficient) $\Lambda_0 = 14.75$ $\mu$m, thereby modulating the nonlinear optical coefficient. The wavelength converter is supplied with signal light 13 and pump light 15 via a multiplexer 17. The wavelength converter can carry out the wavelength conversion of the 1.55 $\mu$m band signal light 13 by the 0.78 $\mu$m band pump light 15.

In such a converter, the phase mismatch amount $\Delta\beta$ is given by the following equation.

$$\Delta\beta = 2\pi \cdot \left(\frac{n_3}{\lambda_3} - \frac{n_2}{\lambda_2} - \frac{n_1}{\lambda_1}\right) \quad (2)$$

where $n_1$ is the refractive index of the $LiNbO_3$ for the signal light 13 with the wavelength $\lambda_1$; $n_2$ is the refractive index for idler light (difference frequency light) 14 with the wavelength $\lambda_2$; $n_3$ is the refractive index for the pump light 15 with the wavelength $\lambda_3$; and $\Lambda_0$ is the modulation period of the nonlinear optical coefficient. The conversion efficiency $\eta$ is given by the following equation using the phase mismatch amount $\Delta\beta$.

$$\eta = \eta_{max} \cdot \left\{ \frac{\sin\left[\left(\Delta\beta - \frac{2\pi}{\Lambda_0}\right) \cdot \frac{L}{2}\right]}{\left[\left(\Delta\beta - \frac{2\pi}{\Lambda_0}\right) \cdot \frac{L}{2}\right]} \right\}^2 \quad (3)$$

where L is the length of the nonlinear optical medium in the waveguide direction. Accordingly, the conversion efficiency $\eta$ of the wavelength converter takes the maximum value when the phase mismatch amount $\Delta\beta$ is $2\pi/\Lambda_0$. For example, consider the case where the wavelength $\lambda_1$ of the signal light 13 is fixed. In this case, the wavelength of the pump light 15 that satisfies the "quasi-phase matching condition", in which the phase mismatch amount $\Delta 62$ given by the foregoing equation (2) becomes $2\pi/\Lambda_0$, depends on the chromatic dispersion of the refractive index of the nonlinear optical medium, and is determined uniquely if the modulation period $\Lambda_0$ is given.

Varying the wavelength of the pump light 15 from the quasi-phase match wavelength that satisfies the quasi-phase matching condition, the conversion efficiency $\eta$ reduces according to the foregoing equations (2) and (3). FIG. 1B is a graph illustrating the dependence of the conversion efficiency $\eta$ on the phase mismatch amount $\Delta\beta$ in which the conversion efficiency $\eta$ is normalized in such a manner that the maximum value becomes one. Assume that the length of the optical waveguide 12 of the wavelength converter consisting of the $LiNbO_3$ is 42 mm. Then, the band of the phase mismatch amount $\Delta\beta$ in which the conversion efficiency $\eta$ becomes half the maximum value is very narrow of about 0.1 nm in terms of 0.78 $\mu$m band pump wavelength.

As is clear from the foregoing equation (1), a plurality of pump light beams with different wavelengths are required to convert the wavelength $\lambda_1$ of the signal light 13 to the difference frequency light with a given wavelength ($\lambda_2'$) However, the conventional modulation structure as illustrated in FIG. 1A, in which the nonlinear optical coefficient varies periodically at a uniform period, cannot vary the wavelength of the pump light substantially because of the narrow allowable range of the wavelength of the pump light. As a result, it cannot achieve the conversion to the difference frequency light with a given wavelength.

Next, to handle the different pump light wavelengths, a method is also possible in which modulation structures with a plurality of different modulation periods are disposed sequentially in the longitudinal direction. However, when the total length of the nonlinear optical media is fixed, the length of a nonlinear optical medium used in each modulation period is reduced. Generally, the conversion efficiency $\eta$ of the wavelength converter utilizing the second order nonlinear optical effect is proportional to the square of the length of the nonlinear optical medium. Accordingly, disposing four types of the modulation periods will reduce the conversion efficiency $\eta$ to 6.25% as compared with the case where the nonlinear optical medium with the same length is used.

To configure a wavelength converter capable of coping with a plurality of pump light wavelengths, a method of providing a periodically modulated structure with a phase reversal structure is proposed by M. H. Chou et al. (Optics Letters, Vol. 24, p. 1157 (1999)).

FIGS. 2A and 2B are diagram illustrating a conventional wavelength converter capable of coping with a plurality of pump light wavelengths by providing a phase reversal structure to a periodically modulated structure: FIG. 2A is a plan view schematically showing a configuration of the wavelength converter; and FIG. 2B is an enlarged view of its portion. In addition, FIGS. 3A–3F are graphs illustrating the behavior of the phase reversal in the wavelength converter, and the dependence of the conversion efficiency on the phase mismatch amount.

As the wavelength converter shown in FIG. 1A, the wavelength converter forms an optical waveguide 22 in a LiNbO$_3$ substrate 21 used as the nonlinear optical medium by the proton exchange method, and provides the modulation to the nonlinear optical coefficient by periodically reversing the spontaneous polarization of the LiNbO$_3$ at a fundamental modulation period $\Lambda_0$=14.75 $\mu$m. More specifically, the wavelength converter forms a phase reversal structure by reversing by an amount of 180 degrees the phase of the polarization reversal structure, which has a fixed fundamental period $\Lambda_0$ (fundamental modulation period of 14.75 $\mu$m), at a longer uniform period $\Lambda_{ph}$, thereby enabling the conversion efficiency $\eta$ to have peaks at a plurality of phase mismatch amounts $\Delta\beta$. Incidentally, using the pump light 25 with the wavelength $\lambda_3$ in the 0.78 $\mu$m band incident via the multiplexer 27, the wavelength converter can also achieve the wavelength conversion of the signal light 23 with the wavelength $\lambda_1$ in the 1.55 $\mu$m band incident via the same multiplexer 27 into the difference frequency light 24 with the wavelength $\lambda_2$.

FIG. 3A is a diagram illustrating the phase variation in the longitudinal direction in a nonlinear optical medium with a polarization reversal structure having the phase reversal with a phase reversal period $\Lambda_{ph}$ of 14 mm and a duty factor of 50%. FIG. 3B is a diagram illustrating the dependence of the conversion efficiency on the phase mismatch amount, which is normalized with respect to the conversion efficiency of a wavelength converter which uses a nonlinear optical medium with the same length as the nonlinear optical medium shown in FIG. 1A, but without the phase reversal structure. In the wavelength converter, the length of the optical waveguide in which the polarization reversal is formed is 42 mm.

As seen from FIG. 3B, the conversion efficiency becomes maximum when the phase mismatch amount $\Delta\beta$ is $\{(2\pi/\Lambda_0)-(2\pi/\Lambda_{ph})\}$ and $\{(2\pi/\Lambda_0)+(2\pi/\Lambda_{ph})\}$, which indicates that the two pump wavelengths can be used for the wavelength conversion.

In addition, as illustrated in FIGS. 3C and 3D, setting the period $\Lambda_{ph}$ at 7 mm and the duty factor of the phase reversal at 26.5% makes the conversion efficiency maximum when the phase mismatch amount $\Delta\beta$ equals $\{(2\pi/\Lambda_0)-(2\pi/\Lambda_{ph})\}$, $(2\pi/\Lambda_0)$ and $\{(2\pi/\Lambda_0)+(2\pi/\Lambda_{ph})\}$, thereby enabling the wavelength conversion to use the three pump wavelengths.

Furthermore, as illustrated in FIGS. 3E and 3F, superimposing two phase reversal with period $\Lambda_{ph}$ and $2\Lambda_{ph}$ make the conversion efficiency maximum when the phase mismatch amount $\Delta\beta$ is $\{(2\pi/\Lambda_0)-(6\pi/\Lambda_{ph})\}$, $\{(2/\Lambda_0)-(2\pi/\Lambda_{ph})\}$, $\{(2\pi/\Lambda_0)+(2\pi/\Lambda_{ph})\}$ and $\{(2\pi/\Lambda_0)+(6\pi/\Lambda_{ph})\}$. Thus, four peaks are obtained at every $4\pi/\Lambda_{ph}$ interval, which enables the wavelength conversion using the four pump wavelengths.

However, the conventional wavelength converter with the foregoing configuration has the following problems.

First, the normalized conversion efficiency of the structure with the four peaks as illustrated in FIG. 3F brings about spurious secondary peaks of the conversion efficiency other than the desired wavelengths. As a result the conversion efficiency of the converter is reduced down to 17%.

Second, trying to obtain the peaks of the conversion efficiency at narrow pump light wavelength intervals inevitably requires a long phase reversal structure. This offers a problem of imposing restrictions on placing the phase reversal period in a widely used substrate with the size of 3–4 inches.

The peak intervals of phase matching curves of FIGS. 3A, 3C and 3E are 0.8 nm in terms of the pump wavelength in the 0.78 $\mu$m band, which means that the pump wavelength is variable at 400 GHz intervals. More specifically, from the relationship of equation (1), varying the pump light wavelength brings about the variation of the idler light wavelength by an amount of the variation of the pump light wavelength, which means that the idler light wavelength can be varied at the intervals of 400 GHz.

Considering the application to the WDM communications, devices with narrower intervals such as 200 GHz and 100 GHz will be required. For example, the normalized conversion efficiency of the structure with the four peaks as illustrate in FIG. 3F can narrow the peak intervals by increasing the phase reversal period because the phase mismatch amount $\Delta\beta$ has the peaks at every $4\pi/\Lambda_{ph}$ interval for the phase reversal period $\Lambda_{ph}$. Considering the case where the LiNbO$_3$ optical waveguide handles the pump wavelengths with the intervals of 200 GHz or 100 GHz, the phase reversal period required for the four pump wavelengths becomes very long such as 28 mm and 56 mm.

Third, although the method of handling the number of pump light wavelengths from one to four by superimposing the phase reversal pattern is disclosed in the foregoing document as described above, a method of handling the other number of the pump light wavelengths is unknown.

Consequently, it is difficult to handle a desired number of pump light wavelengths flexibly.

SUMMARY OF THE INVENTION

As a result of studying device structures enabling highly efficient, multi-wavelength pumping, the inventors of the present invention discover a device structure capable of coping with a desired number of pump wavelengths without much losing the efficiency by introducing, into a periodically modulated structure of a nonlinear optical coefficient, a structure in which a continuous frequency modulation structure or phase modulation structure is repeated at a uniform period, and by optimizing a modulation curve of the frequency modulation structure or phase modulation structure. The device structure can provide a wavelength converter and pump wavelength variable type wavelength converting apparatus that enables a design capable of coping with a desired number of the pump light wavelengths, and that can prevent the reduction in the conversion efficiency and can be configured easily using a practical size of a nonlinear optical material.

According to a first aspect of the present invention, there is provided a wavelength converter comprising: a nonlinear optical medium having a frequency modulated periodically modulated structure composed of a modulation unit structure and a frequency modulation structure, the modulation unit structure having a structure in which a nonlinear optical coefficient is modulated periodically at a period nearly equal to a fundamental period $\Lambda_0$ varies nearly continuously, and the frequency modulation structure having a structure in which the modulation unit structure is repeated at a frequency modulation period $\Lambda_f$ longer than the fundamental period $\Lambda_0$; and means for launching light with one or two wavelengths of three wavelengths $\lambda_1$, $\lambda_2$ and $\lambda_3$ including $\lambda_1 = \lambda_2$, which satisfy the following equation, onto the nonlinear optical medium, $$\frac{1}{\lambda_3} = \frac{1}{\lambda_1} + \frac{1}{\lambda_2} \quad (4)$$

wherein the wavelength converter, utilizing a second order nonlinear optical effect occurring in the nonlinear optical medium, converts the input light into outgoing light with a wavelength equal to one of the three wavelengths, and different from at least one of the wavelengths of the incident light.

According to a second aspect of the present invention, there is provided a wavelength converter comprising: a nonlinear optical medium having a phase modulated periodically modulated structure composed of a modulation unit structure and a phase modulation structure, the modulation unit structure having a structure in which a nonlinear optical coefficient is modulated periodically at a period substantially equal to a fundamental period $\Lambda_0$ modulations varies nearly continuously, and the phase modulation structure having a structure in which the phase variation of the modulation unit structure is repeated at a phase modulation period $\Lambda_{ph}$ longer than the fundamental period $\Lambda_0$; and means for launching light with one or two wavelengths of three wavelengths $\lambda_1$, $\lambda_2$ and $\lambda_3$ including $\lambda_1 = \lambda_2$, which satisfy the foregoing equation (4), onto the nonlinear optical medium, wherein the wavelength converter, utilizing a second order nonlinear optical effect occurring in the nonlinear optical medium, converts the input light into outgoing light with a wavelength equal to one of the three wavelengths, and different from at least one of the wavelengths of the incident light.

According to another aspect of the present invention, there is provided a wavelength converting apparatus comprising a pumping source capable of varying its oscillation wavelength or switching a plurality of oscillation wavelengths, and a wavelength converter in accordance with the present invention, wherein the wavelength converter is configured such that it generates difference frequency light in the nonlinear optical medium from input signal light supplied from outside, and incident light supplied from the pumping source; and converts a wavelength of the difference frequency light by selecting the wavelength of the pump light with a phase mismatch amount that will maximize a generation efficiency of the difference frequency light.

According to the first aspect of the present invention, a phase mismatch amount $\Delta\beta$ may be determined such that it will maximize the conversion efficiency at $2\pi/\Lambda_0 \pm 2\pi i/\Lambda_f$ (i=0, 1, . . . , n, where n is a positive integer), at $2\pi/\Lambda_0 \pm 2\pi(2i+1)/\Lambda_f$ (i=0, 1, . . . , n, where n is a positive integer), or at $2\pi/\Lambda_0 + 2\pi i/\Lambda_f$ (i=m, m+1, . . . , n, where m and n are positive or negative integers satisfying $|m| \neq |n|$). This makes it possible to provide a wavelength converter and wavelength converting apparatus that enable the design capable of coping with a desired number of pump wavelengths, and that can prevent the reduction in the conversion efficiency, and can be configured easily using a practical size of the nonlinear optical material.

According to the second aspect of the present invention, the phase mismatch amount $\Delta\beta$ maybe determined such that it will maximize the conversion efficiency at $2\pi/\Lambda_0 \pm 2\pi i/\Lambda_{ph}$ (i=0, 1, . . . , n, where n is a positive integer), at $2\pi/\Lambda_0 \pm 2\pi(2i+1)/\Lambda_{ph}$ (i=0, 1, . . . , n, where n is a positive integer), or at $2\pi/\Lambda_0 \pm 2\pi i/\Lambda_{ph}$ (i=m, m+1, . . . , n, where m and n are positive or negative integers satisfying $|m| \neq |n|$. This makes it possible to provide a wavelength converter and wavelength converting apparatus that enable the design capable of coping with a desired number of pump wavelengths, and that can prevent the reduction in the conversion efficiency, and can be configured easily using a practical size of the nonlinear optical material.

The above and other objects, effects, features and advantages of the present invention will become more apparent from the following description of embodiments thereof taken in conjunction with the accompanying drawings.

BRIEF DESCRIPTION OF THE DRAWINGS

FIGS. 3A–3F are diagrams illustrating phase reversal behavior and the dependence of the conversion efficiency on the phase mismatch amount in the wavelength converter as shown in FIG. 2A;

FIGS. 4A and 4B are schematic diagrams showing a first configuration of the wavelength converter in accordance with the present invention;

FIGS. 5A–5D are graphs illustrating examples of frequency variation curves and the dependence of the conversion efficiency on the phase mismatch amount of the wavelength converter in accordance with the present invention capable of coping with a variety of pump wavelength numbers;

DETAILED DESCRIPTION OF THE PREFERRED EMBODIMENTS

Figure 1A:
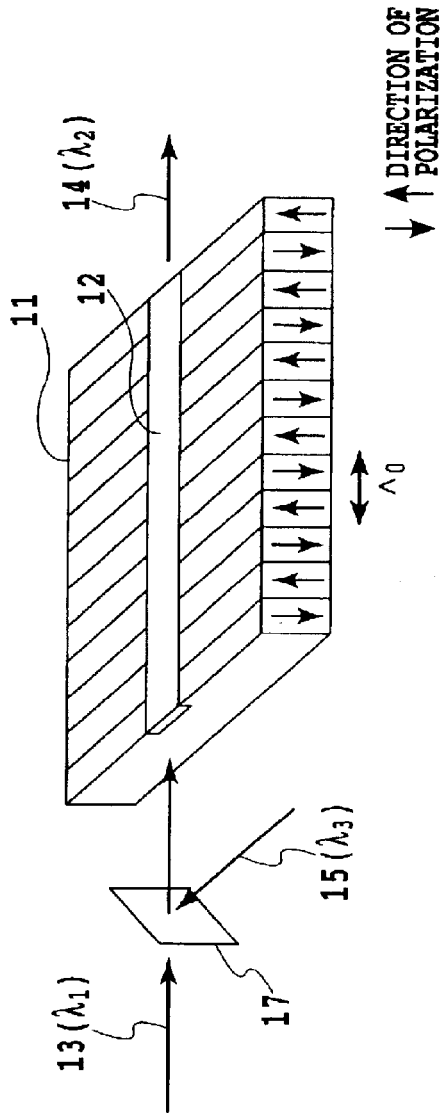
FIG. 1A is a schematic diagram showing a configuration of a conventional wavelength converter (difference frequency generator) utilizing a second order nonlinear optical effect.
Figure 1B:
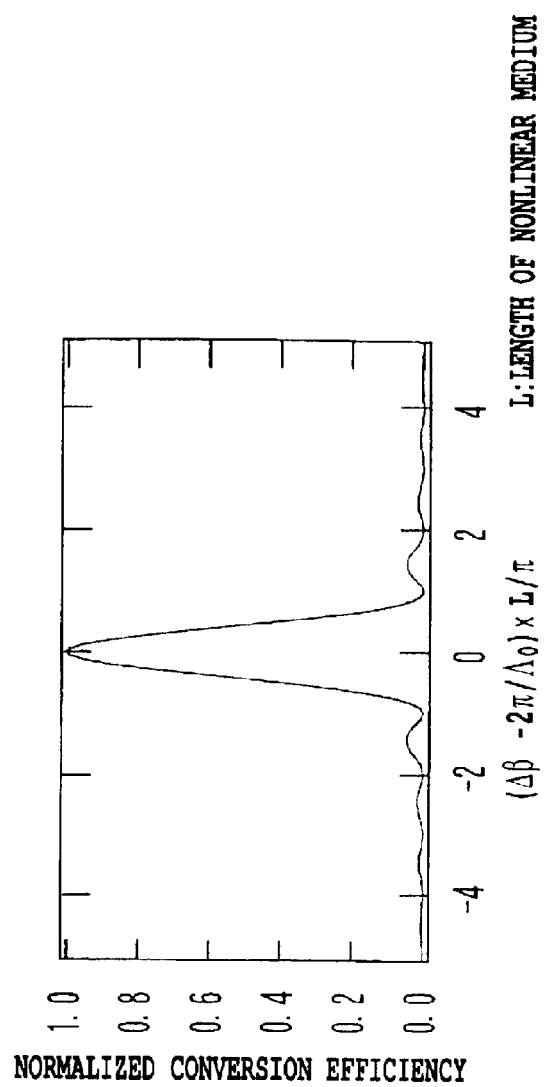
FIG. 1B is a graph illustrating the dependence of the conversion efficiency on a phase mismatch amount in the wavelength converter as shown in FIG. 1A.
Figures 2A, 2B:
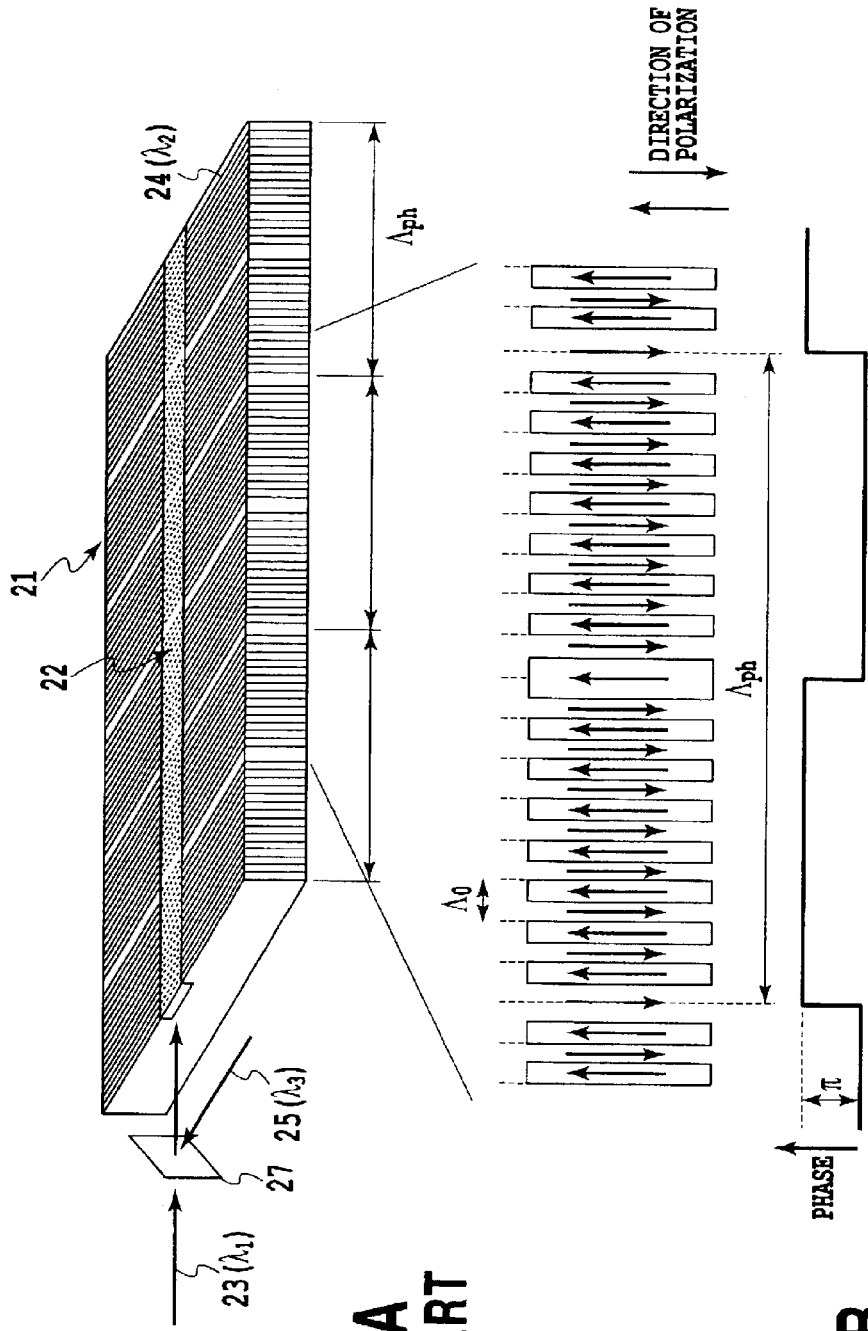
FIG. 2A is a schematic plan view showing a configuration of a conventional wavelength converter capable of coping with a plurality of pump light wavelengths by providing a phase reversal structure to a periodical modulation structure.
FIG. 2B is an enlarged view of a part of the wavelength converter as shown in FIG. 2A.

The embodiments in accordance with the present invention will now be described with reference to the accompanying drawings. The term "wavelength converter (and wavelength converting apparatus)" used in the instant specification refers not only to a wavelength converter (and wavelength converting apparatus), but also to an optical amplifier (and optical amplifying apparatus) when the wavelength converter (and wavelength converting apparatus) has an optical amplifying function.

First Configuration of Wavelength Converter

FIGS. 4A and 4B are schematic diagrams showing a first configuration of the wavelength converter in accordance with the present invention. The following description will be made by way of example of a difference frequency generator that employs as a nonlinear optical medium a ferroelectric crystal material such as $LiNbO_3$ capable of reversing the sign of the nonlinear optical coefficient by reversing the polarization.

The wavelength converter has a nonlinear optical medium, to which are launched the light beams with wavelengths $\lambda_3$ and $\lambda_1$, among the three wavelengths ($\lambda_1$, $\lambda_2$, and $\lambda_3$ including the case where $\lambda_1=\lambda_2$) that satisfy the foregoing equation (1). Thus, the wavelength converter converts to the outgoing light with the wavelength $\lambda_2$ by the second order nonlinear optical effect occurring in the nonlinear optical medium.

As illustrated in FIG. 4A, the wavelength converter has an optical waveguide 42 formed in a nonlinear optical material substrate 41. It brings about modulation in a nonlinear optical coefficient by periodically reversing the spontaneous polarization of the nonlinear optical medium, and converts signal light 43 with the wavelength $\lambda_1$ to idler light 44 with the wavelength $\lambda_2$ using pump light 45 with the wavelength $\lambda_3$.

In the wavelength converter, the modulation period of the nonlinear optical coefficient is nearly periodically modulated in the longitudinal direction (the traveling direction of light) of the nonlinear optical medium. It has a "modulation unit structure" (FIG. 4B) that varies nearly continuously (gradually) at about the fundamental (reversing) period $\Lambda_0$ (at the fundamental period $\Lambda_0$ and at periods $\Lambda_0'$, $\Lambda_0''$ etc. nearly equal to the fundamental period) in the direction of the optical waveguide 42. In addition, the nonlinear optical medium has a "frequency modulation structure" (FIG. 4A) that is, the modulation unit is repeated at a "frequency modulation period" $\Lambda_f$ longer than the fundamental (reversing) period $\Lambda_0$, thereby constituting a "frequency modulation periodically modulated structure". Inputting the signal light 43 with the wavelength $\lambda_1$ and pump light 45 with the wavelength $\lambda_3$ to the optical waveguide 42 composed of the nonlinear optical medium with the frequency modulated periodically modulated structure via a multiplexer 47 generates the idler light 44 with the wavelength $\lambda_2$ different from that of the signal light 43 by the second order nonlinear optical effect the pump light 45 brings about in the nonlinear optical medium.

Although the optical waveguide type structure, which has a strong optical confinement effect in the nonlinear optical medium and can achieve long distance interaction, is shown in FIG. 4A to obtain a high wavelength conversion efficiency, this is not essential. For example, a converter for converting a high power laser wavelength can assume a bulk type structure.

Next, a method of setting the frequency variation curve will be described. Assume that d(z) denotes the nonlinear optical coefficient at a position z on the axis in the traveling direction of light, and that the optical waveguide is present from z=0 to z=L. Then, the conversion efficiency $\eta$ after the pump light and signal light propagate through the light optical waveguide (z=L) is given by the following equation for a phase mismatch amount $\Delta\beta$.

$$\eta(\Delta\beta) \propto \left| \int_0^L d(z)\exp(-i\Delta\beta z)dz \right|^2 \quad (5)$$

The variation in the conversion efficiency $\eta$ for the phase mismatch amount $\Delta\beta$ can be calculated from this equation by obtaining the spatial variation d(z) of the nonlinear optical coefficient, followed by the Fourier transform of d(z). According to the present invention, the nonlinear optical coefficient is modulated at every period of about $\Lambda_0$, and the periodically modulated "modulation unit structure" is further modulated at another period $\Lambda_f$. As a result, it has peaks of the conversion efficiency $\eta$ at the phase mismatch amount $\Delta\beta$ ($\Delta\beta=2\pi/\Lambda_0$, $2\pi/\Lambda_0\pm2\pi/\Lambda_f$, $2\pi/\Lambda_0\pm4\pi/\Lambda_f$, . . . ) separated apart from the central value $2\pi/\Lambda_0$ by every $2\pi/\Lambda_f$.

To achieve the maximum efficiency for a desired number of the pump light wavelengths, it is necessary to make the desired peaks large and the remaining peaks small. For example, to cope with three pump wavelengths, it is necessary to make the three peaks maximum at $\Delta\beta=2\pi/\Lambda_0$ and $2\pi/\Lambda_0\pm2\pi/\Lambda_f$. To achieve the maximum efficiency at L peaks, the following steps are taken: first, the spatial variation d(z) of the nonlinear optical coefficient is calculated with varying the frequency variation curve of each modulation unit structure; second, the Fourier transform of d(z) is carried out to obtain the conversion efficiency at the desired peaks; third, the trial function T given by the following equation is calculated; and finally, the optimization is made by the successive calculation for the trial function T to become minimum.

$$T = \sum_{j=0}^{L} \left[ \eta(j) - \frac{\eta_{norm}}{L} \right]^2 \quad (6)$$

where $\eta$ (j) is the efficiency at j-th peak, and $\eta_{norm}$ is the efficiency of a wavelength converter that has the nonlinear optical medium of the same length, but has no frequency variation of the nonlinear optical coefficient.

The inventors of the present invention, having made a study of determining the frequency variations in the nonlinear optical coefficient for a variety of pump wavelength numbers, discovers that the present invention can cope with a desired number of the pump wavelengths without deteriorating the conversion efficiency.

FIGS. 5A–5D are graphs illustrating examples of frequency variation curves and the dependence of the conversion efficiency on the phase mismatch amount of the wavelength converter in accordance with the present invention capable of coping with a variety of pump wavelength numbers. In these figures, the conversion efficiency is normalized with respect to the conversion efficiency of a wavelength converter whose nonlinear medium has the same length, and whose nonlinear optical coefficient is modulated at a uniform period.

For example, FIGS. 5A and 5B are graphs illustrating the frequency variation curve and the dependence of the conversion efficiency on the phase mismatch amount of a wavelength converter corresponding to the three pump light wavelengths, respectively. As illustrated in FIG. 5B, the spurious secondary peaks of the dependence of the conversion efficiency on the phase mismatch amount are reduced as compared with the characteristics of the conventional wavelength converter as illustrated in FIG. 3D, with achieving a high conversion efficiency of 30%.

The wavelength converter in accordance with the present invention can easily cope with the desired number of the pump wavelengths by determining the following factors appropriately by the foregoing method, thereby varying their shapes. The factors are the fundamental period $\Lambda_0$ of the modulation period of the nonlinear optical coefficient in the "modulation unit structure"; the repetition period $\Lambda_f$ of the "modulation unit structure"; and the frequency variation curve of the "frequency modulation structure" formed by the repetition of the "modulation unit structure". The method of determining the periods $\Lambda_0$ and $\Lambda_f$ and the frequency variation curve varies in accordance with the objective. In any method, however, the frequency variation curve is determined such that the conversion efficiency takes a local maximum when the phase mismatch amount $\Delta\beta$ has a particular value determined by the periods $\Lambda_0$ and $\Lambda_f$.

More specifically, a first method determines such that the conversion efficiency takes a local maximum when the phase mismatch amount $\Delta\beta$ is $2\pi/\Lambda_0\pm2\pi i/\Lambda_f$ (i=0, 1, . . . , n, where n is a positive integer). A second method determines such that the conversion efficiency takes a local maximum when the phase mismatch amount $\Delta\beta$ is $2\pi/\Lambda_0 \pm 2\pi(2i+1)/\Lambda_f$ (i=0, 1, ..., n, where n is a positive integer). A third method determines such that the conversion efficiency takes a local maximum when the phase mismatch amount $\Delta\beta$ is $2\pi/\Lambda_0 + 2\pi i/\Lambda_f$ (i=m, m+1, ..., n, where m and n are positive or negative integers satisfying $|m| \neq |n|$.

For example, a wavelength converter capable of coping with the four pump light wavelengths can be configured by determining the frequency variation curve as illustrated in FIG. 5C, which enables the conversion efficiency to become maximum when the phase mismatch amount is $\{(2\pi/\Lambda_0) - (2\pi/\Lambda_f)\}$, $(2\pi/\Lambda_0)$, $\{(2\pi/\Lambda_0)+(2\pi/\Lambda_f)\}$ and $\{(2\pi/\Lambda_0)+(4\pi/\Lambda_f)\}$ as illustrated in FIG. 5D.

Thus, the wavelength converter in accordance with the present invention can obtain the four peaks at every $2\pi/\Lambda_f$ interval of the phase mismatch amount. Consequently, it can implement the pump wavelength spacing with the periodic structure of half the length of the wavelength converter with the conventional structure. For example, assume that the optical waveguide formed in $LiNbO_3$ by the proton exchange method is used as the nonlinear optical medium, that the nonlinear optical coefficient is provided with modulation by periodically reversing the spontaneous polarization of the $LiNbO_3$, and that the period $\Lambda_f$ in FIGS. 5A and 5C is determined at about 14 mm or 28 mm. In this case, the spacing of the available pump wavelengths corresponding to the peaks of the phase matching curve becomes 200 GHz and 100 GHz, respectively. In other words, it can achieve the same pump wavelength spacing by half the repetition period of that of the conventional wavelength converter. As a result, it can be readily placed on a commonly used substrate with a diameter of 3–4 inches.

As described above, the wavelength converter in accordance with the present invention employs as the structure of the nonlinear optical medium the "frequency modulation structure" that repeats, at the period $\Lambda_f$, the "modulation unit structure", in which the modulation period of the nonlinear optical coefficient varies nearly continuously. Thus, it can cope with a desired number of pump wavelengths. In addition, it can suppress the deterioration of the conversion efficiency, and implement a pump wavelength variable type wavelength converter (and a wavelength converting apparatus using it) that can be configured easily using a practical size of the nonlinear optical material. Such an advantage can be achieved for the first time by employing the configuration of the wavelength converter in accordance with the present invention.

Next, a first configuration of the wavelength converter in accordance with the present invention will be described in more detail by way of embodiments 1–5.

Embodiment 1

Figure 6A:
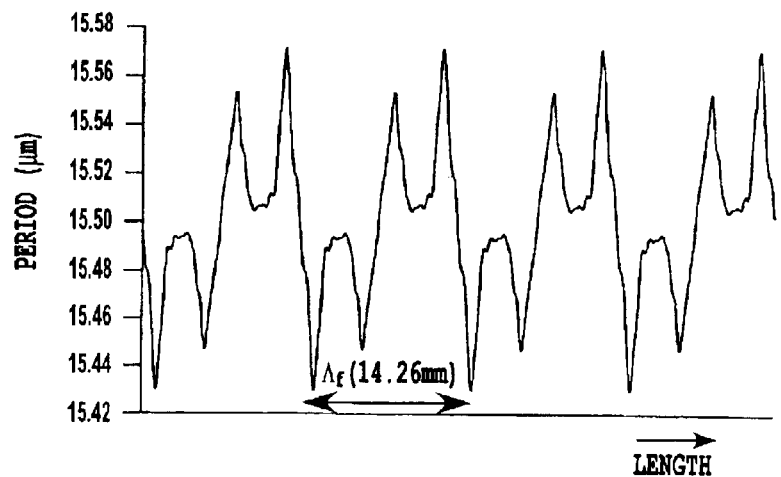
FIG. 6A is a graph illustrating a period variation curve in a modulation structure of a nonlinear optical coefficient used in a first embodiment of the wavelength converter in accordance with the present invention.
Figure 6B:
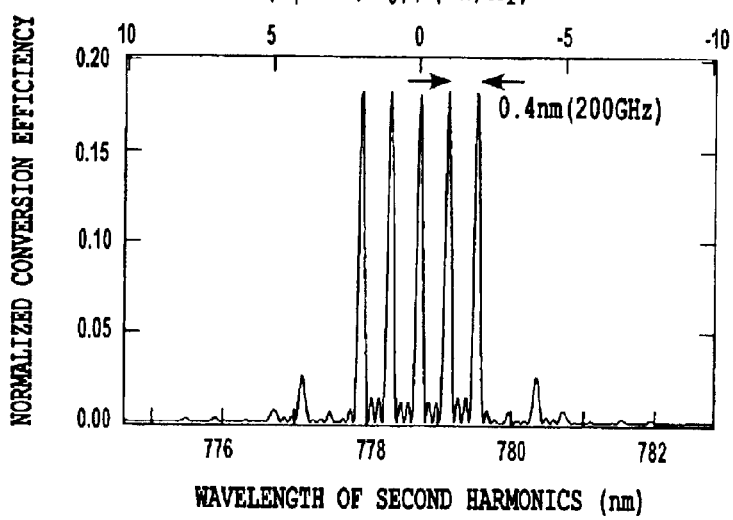
FIG. 6B is a graph illustrating a normalized conversion efficiency obtained when evaluating SHG characteristics by using a wavelength tunable light source in a 1.55 μm band in the first embodiment of the wavelength converter in accordance with the present invention.
Figure 6C:
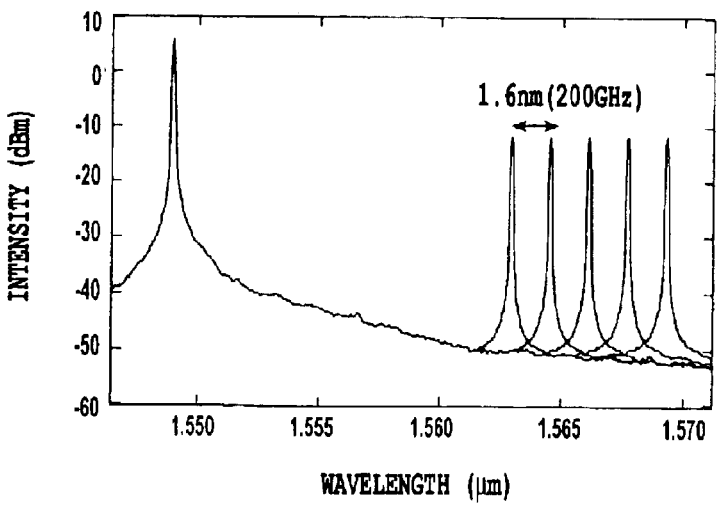
FIG. 6C is a graph illustrates spectra of 1.55 μm band signal and idler light when inputting signal light and pump light in the first embodiment of the wavelength converter in accordance with the present invention.

FIGS. 6A–6C are graphs illustrating a modulation structure and operation characteristics of a nonlinear optical coefficient of a first embodiment of the wavelength converter in accordance with the present invention. The wavelength converter is configured such that it receives pump light with a wavelength in a 0.78 μm band, and converts signal light with a wavelength in a 1.55 μm band to difference frequency light. Here, FIG. 6A is a graph illustrating a period variation curve in a modulation structure of a nonlinear optical coefficient used in the present embodiment; FIG. 6B is a graph illustrating a normalized conversion efficiency obtained when evaluating SHG characteristics by using a 1.55 μm band wavelength tunable light source; and FIG. 6C is a graph illustrates spectra of 1.55 μm band idler light when inputting the signal light and pump light.

The wavelength converter uses a Z-cut of $LiNbO_3$ substrate (a substrate that is cut perpendicularly to the Z axis). Its polarization reversal section undergoes polarization reversal at a fundamental period of about 15.5 μm by an electric field application method (thus the "polarization reversal period" is about 15.5 μm). On the substrate having the polarization reversal in this way, a patterning of $SiO_2$ is made by a photolithography. Then, it is immersed in benzoic acid at a temperature of about 180 degrees, followed by forming an optical waveguide by annealing in an oxygen atmosphere. The wavelength converter is configured such that it can cope with five pump wavelengths.

Next, the polarization reversal section will be described in more detail. The polarization reversal section of the wavelength converter has the following structure: The frequency modulation period $\Lambda_f$, a repetition period of the modulation unit structure, is 14.26 mm; the total length of the polarization reversal section is 57.04 mm; the frequency variation pattern is repeated four periods (=57.04 mm/14.26 mm); and the number of the polarization reversal structures allotted to one period of the frequency variation pattern is about 920 periods (=14.26 mm/15.5 μm). The present embodiment is configured such that the period of the frequency variation is divided into about 460 subdivisions by every two periods of the polarization reversal structure with the period of about 15.5 μm, and that the maximum conversion efficiency is achieved at the five pump wavelengths by optimizing the period of each polarization reversal structure unit. As a result, as in the period variation curve as illustrated in FIG. 6A, the frequency variation is produced such that the polarization reversal period varies smoothly in one period around the center of 15.5 μm.

As for the $LiNbO_3$ substrate with the polarization reversal structure used in the present embodiment, a photo resist is applied to the +Z plane of the substrate, followed by patterning by the photolithography. Then electrodes are evaporated onto the substrate, and an electric field is applied to both sides of the substrate via an electrolyte so that the polarization are reversed in the portions where the electrodes directly touch the substrate. Here, the width of the regions in which the polarization reversal occurs is slightly wider than the width of the electrodes. Accordingly, it is necessary to design a mask used for the photolithography considering the width difference. In the present embodiment, after calculating the ideal frequency variation polarization reversal structure, the mask is designed such that the width of the photo resist becomes wider by an increase in the width of the reversal domain.

The horizontal axis of FIG. 6B represents the wavelength of 0.78 μm band second harmonics generated by the wavelength converter. On the other hand, the vertical axis represents the conversion efficiency, which is normalized with respect to the conversion efficiency of a wavelength converter which includes the polarization reversal structure of a uniform period of 15.5 μm in the polarization reversal section with the same length of 57.04 mm. It is possible from the results illustrated in this figure to evaluate the dependence of the conversion efficiency on the wavelength, when the 0.78 μm band pump light is input to the wavelength converter to bring about the difference frequency generation.

As illustrated in FIG. 6B, five peaks are obtained around the central wavelength of 778.7 nm at about 0.4 nm spacing, which means that the pump light wavelength is variable at 200 GHz spacing. In addition, it is seen that the conversion efficiency, which is about 18% of that of the converter with the uniform period, is equivalent to the conversion efficiency of the conventional wavelength converter with the four wavelengths as illustrated in FIG. 3F although the pump wavelength number is greater.

FIG. 6C illustrates the 1.55 μm band spectra when the wavelength of the signal light is 1548.9 nm, and the wavelength of the pump light is varied as 777.9, 778.3, 778.7, 779.1, and 779.5 nm at about 0.4 nm spacing. It is seen from FIG. 6C that the wavelength of the idler light is variable at 1.6 nm spacing with the variation of the wavelength of the pump light.

Embodiment 2

Figure 7A:
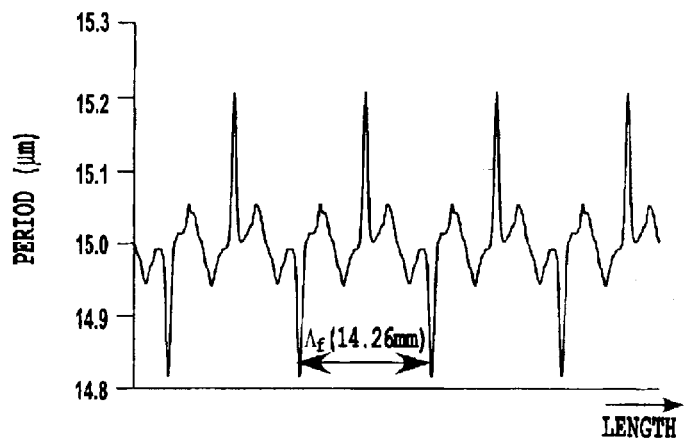
FIG. 7A is a graph illustrating a period variation curve in a modulation structure of a nonlinear optical coefficient used in a second embodiment of the wavelength converter in accordance with the present invention.
Figure 7B:
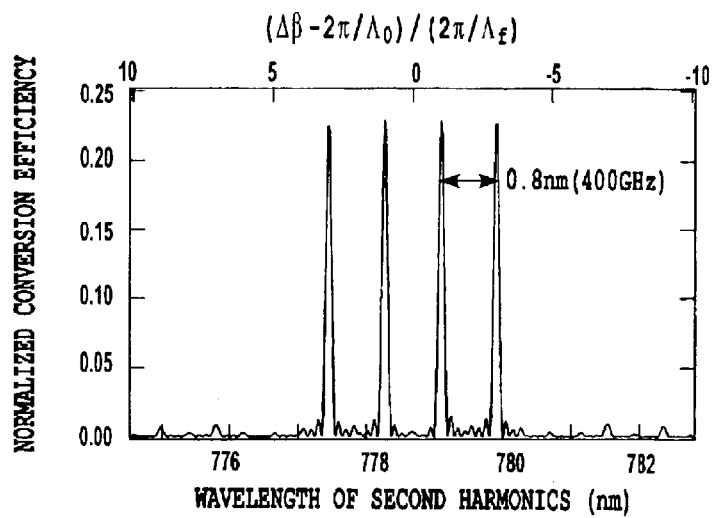
FIG. 7B is a graph illustrating a normalized conversion efficiency obtained when evaluating SHG characteristics by using a wavelength tunable light source in a 1.55 μm band in the second embodiment of the wavelength converter in accordance with the present invention.
Figure 7C:
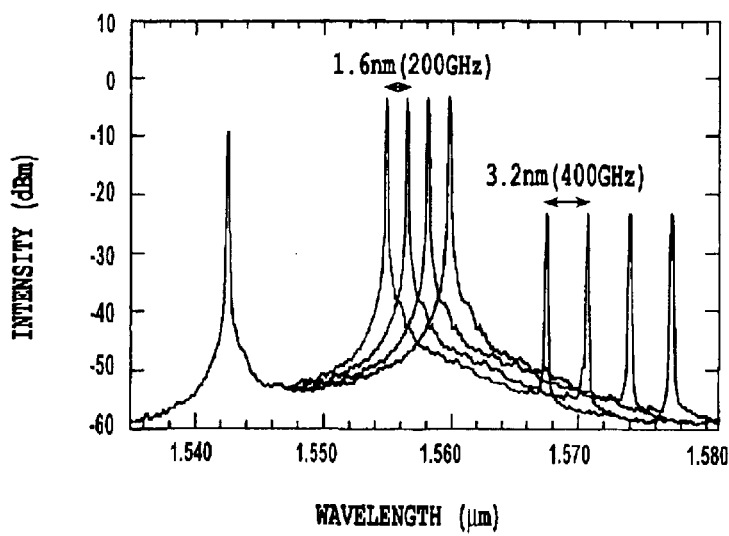
FIG. 7C is a graph illustrates spectra of 1.55 μm band signal, pump, and idler lights when inputting signal light and pump light in the second embodiment of the wavelength converter in accordance with the present invention.

FIGS. 7A–7C are graphs illustrating a modulation structure and operation characteristics of a nonlinear optical coefficient of a second embodiment of the wavelength converter in accordance with the present invention. FIG. 7A is a graph illustrating a period variation curve in a modulation structure of a nonlinear optical coefficient used in the present embodiment; FIG. 7B is a graph illustrating a normalized conversion efficiency obtained when evaluating SHG characteristics by using a 1.55 μm band wavelength tunable light source; and FIG. 7C is a graph illustrates spectra of 1.55 μm band idler light when inputting signal light and pump light.

In contrast with the wavelength converter of the first embodiment configured to be able to cope with odd numbered pump wavelengths, the wavelength converter of the present embodiment is configured such that it can carry out the wavelength conversion using even numbered pump wavelengths. As seen from FIGS. 6A–6C, the configuration of the first embodiment, which provides the fundamental period $\Lambda_0$ with the frequency modulation of the period $\Lambda_f$, has the peaks of the conversion efficiency at every $2\pi/\Lambda_f$ interval around the center at which the phase mismatch amount is $2\pi/\Lambda_0$.

Accordingly, to achieve the even numbered peaks when the central peak is denoted as a zero order peak, the period variation curve should be set in such a manner that only the odd order peaks counted from the central peak are made large, with the even order peaks including the zero order peak being made small.

Thus, the present embodiment is configured as illustrated in FIG. 7B such that the four peaks, that is, +3rd, +1st, −1st, and −3rd peaks, become maximum.

Incidentally, in the present embodiment, the polarization reversal period is about 15.5 μm, the total length of the polarization reversal section is 57.04 mm, the repetition period of the modulation unit structure (frequency modulation period) $\Lambda_f$ is 14.26 mm, and the frequency variation pattern is repeated four periods. Accordingly, the number of the polarization reversal structures allotted to one period of the frequency variation pattern is about 920 periods. The present embodiment is configured such that the period of the frequency variation is divided into about 460 subdivisions by every two periods of the polarization reversal structure with the period of about 15.5 μm, and that the maximum conversion efficiency is achieved at the four pump wavelengths by optimizing the period of each polarization reversal structure unit. In addition, as in the period variation curve as illustrated in FIG. 7A, the frequency variation is produced such that the polarization reversal period varies smoothly in one period around the center of 15.5 μm.

As illustrated in FIG. 7B, four peaks are obtained around the central wavelength of 778.7 nm at about 0.8 nm spacing, which means that the pump light wavelength is variable at 400 GHz spacing. In the present embodiment, the frequency variation curve is configured so that the peaks are produced at such a spacing that eliminates the even order peaks. As a result, although it employs the same fundamental period and frequency modulation period as those of the first embodiment, the peak spacing is doubled. In this way, the present invention can flexibly change the number of peaks and the peak spacing by varying the period variation curve.

The conversion efficiency represented along the vertical axis of FIG. 7B is normalized with respect to the conversion efficiency of a wavelength converter which includes the polarization reversal structure of a uniform period of 15.5 μm in the polarization reversal section with the same length of 57.04 mm. It is seen from FIG. 7B that the conversion efficiency, which is about 23% of that of the converter with the structure having the polarization reversal of the uniform period, can implement the conversion efficiency of about 1.25 times greater than that of the conventional wavelength converter with the four wavelengths as illustrated in FIG. 3F although the pump wavelength number is the same.

Although the first embodiment is an example that receives the pump light in the 0.78 μm band from the outside, and carries out the wavelength conversion in the 1.55 μm band, this is not essential. It can also carry out the so-called cascade pumping that uses a 1.55 μm band light source as external pump light, for example, and generates 0.78 μm band light by the SHG in the nonlinear optical medium to use it as the pump light.

FIG. 7C illustrates the 1.55 μm band spectra when the operation of the wavelength converter in accordance with the present invention is verified by the cascade pumping scheme, and when the wavelength of the signal light is 1542.7 nm, and the wavelength of the pump light is varied as 1559.8, 1558.2, 1556.6, and 1555.0 nm at about 1.6 nm spacing. It is seen from FIG. 7C that the wavelength of the idler light is variable at 3.2 nm spacing with the variation of the wavelength of the pump light.

Embodiment 3

Figure 8A:
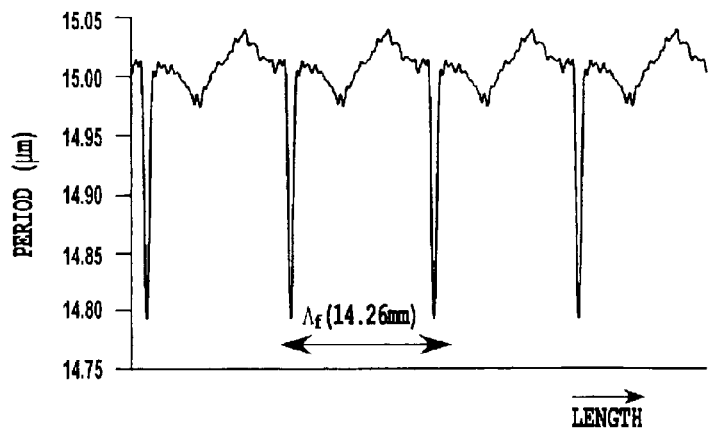
FIG. 8A is a graph illustrating a period variation curve in a modulation structure of a nonlinear optical coefficient used in a third embodiment of the wavelength converter in accordance with the present invention.
Figure 8B:
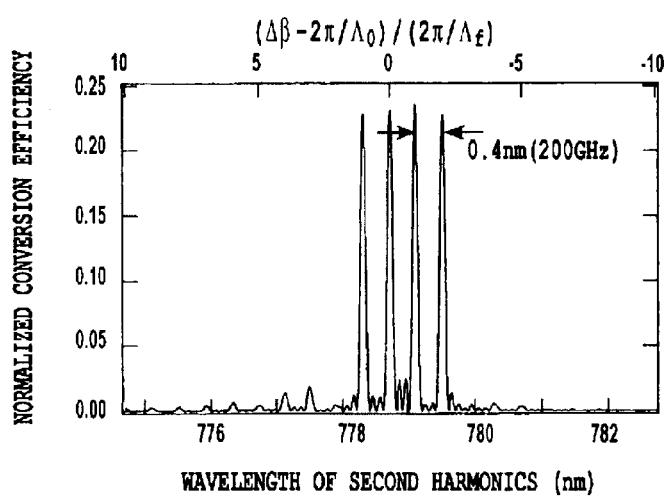
FIG. 8B is a graph illustrating a normalized conversion efficiency obtained when evaluating SHG characteristics by using a wavelength tunable light source in a 1.55 μm band in the third embodiment of the wavelength converter in accordance with the present invention.
Figure 8C:
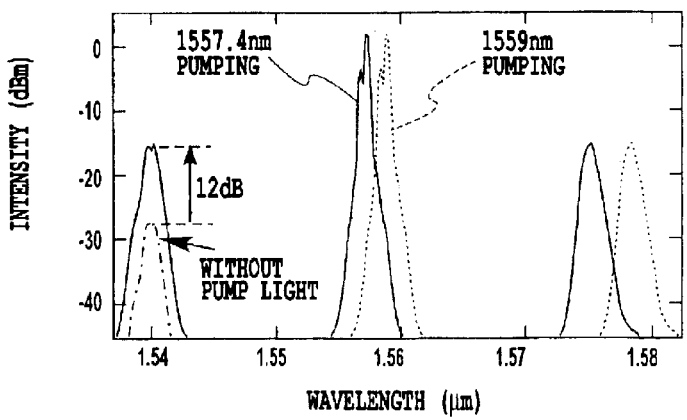
FIG. 8C is a graph illustrates spectra of 1.55 μm band idler light when inputting signal light and pump light in the third embodiment of the wavelength converter in accordance with the present invention.

FIGS. 8A–8C are graphs illustrating a modulation structure and operation characteristics of a nonlinear optical coefficient of a third embodiment of the wavelength converter in accordance with the present invention. FIG. 8A is a graph illustrating a period variation curve in a modulation structure of a nonlinear optical coefficient used in the present embodiment; FIG. 8B is a graph illustrating a normalized conversion efficiency obtained when evaluating SHG characteristics by using a 1.55 μm band wavelength tunable light source; and FIG. 8C is a graph illustrates spectra of 1.55 μm band idler light when inputting signal light and pump light.

The wavelength converter of the foregoing second embodiment is configured to be able to cope with the even numbered pump wavelengths. In addition to this competence, the wavelength converter of the present embodiment is configured such that it can shorten the pump light wavelength spacing. Although the frequency variation curve in the second embodiment is configured such that the peaks are obtained by removing the even order peaks, this is not essential. For example, to achieve the even numbered peaks, a method is possible which determines the frequency variation curve such that the peaks are obtained asymmetrically around zero order peak including the zero order peak. Thus, the present embodiment is configured as illustrated in FIG. 8B such that the four peaks, that is, zero order, −1st, −2nd, and +1st peaks, become maximum. Incidentally, in the present embodiment, the fundamental period $\Lambda_0$ of the polarization reversal is 15.5 μm, the total length of the polarization reversal section is 57.04 mm, the repetition period of the modulation unit structure (frequency modulation period) $\Lambda_f$ is 14.26 mm, and the frequency variation pattern is repeated four periods. Accordingly, the number of the polarization reversal structures allotted to one period of the frequency variation pattern is about 920 periods. The present embodiment is configured such that the period of the frequency variation is divided into about 460 subdivisions by every two periods of the polarization reversal structure with the period of about 15.5 µm, and that the maximum conversion efficiency is achieved at the four pump wavelengths by optimizing the period of each polarization reversal structure unit. In addition, as in the period variation curve as illustrated in FIG. 8A, the frequency variation is produced such that the polarization reversal period varies nearly smoothly in one period around the center of 15.5 µm.

As illustrated in FIG. 8B, four peaks are obtained around the central wavelength of 778.7 nm at about 0.4 nm spacing, which means that the pump light wavelength is variable at 200 GHz spacing. In the present embodiment, the frequency variation curve is configured so that the four peaks are produced asymmetrically around the zero order peak. As a result, although it employs the same fundamental period and frequency modulation period as those of the second embodiment, the peak spacing is halved. In this way, the present invention can flexibly change the number of peaks and the peak spacing by varying the period variation curve.

The conversion efficiency represented by the vertical axis of FIG. 8B is normalized with respect to the conversion efficiency of a wavelength converter which includes the polarization reversal structure of a uniform period of 15.5 µm in the polarization reversal section with the same length of 57.04 mm. It is seen from FIG. 8B that the conversion efficiency, which is about 23% of that of the converter with the structure having the polarization reversal of the uniform period, can implement the conversion efficiency of about 1.25 times greater than that of the conventional wavelength converter with the four wavelengths as illustrated in FIG. 3F although the pump wavelength number is the same.

The present embodiment can vary the wavelength of the idler light at 1.6 nm spacing by using the 1.55 µm band wavelength light as the signal light, and by varying the wavelength of the pump light as 778.3, 778.7, 779.1, and 779.5 nm at about 0.4 nm spacing. Although the present embodiment determines the frequency modulation period $\Lambda_f$ at 14.26 mm to vary the pump light wavelength at 200 GHz spacing, this is not essential. For example, to halve the spacing between the pump light wavelengths to 100 GHz, it can be configured in the same manner except for doubling the frequency modulation period to 28.52 mm. The period enables it to be arranged on a widely used substrate with 3–4 inches in diameter. In this way, according to the present invention, suitably designing the period variation curve (that is, the frequency variation function) enables a period structure shorter than the conventional one to be able to cope with the narrower pump wavelength spacing such as 100 GHz.

When the power of the pump light incident onto the wavelength converter in accordance with the present invention is large enough, it can not only generate the difference frequency light, but also amplify the input light by parametric effect. To check it, the present embodiment generates 0.78 µm band light by the SHG within the nonlinear optical medium by using a 1.55 µm band light source as external pump light, and verifies the amplification by a cascade scheme using the 0.78 µm band light as the pump light.

More specifically, the pump light consists of a pump light pulse train with a repetition frequency of 100 MHz and time width of 100 ps, and the signal light consists of a pulse train with a repetition frequency of 100 MHz and time width of 10 ps. The signal light is launched into the converter of the present embodiment in synchronism with the pump light pulse train to verify the amplification.

FIG. 8C illustrates 1.55 µm band spectra obtained when verifying the converter of the present embodiment by the cascade pumping, in which the wavelength of the signal light is 1540.0 nm, and the wavelength of the pump light is varied as 1557.4 and 1559.0 nm. As illustrated in FIG. 8C, the wavelength of the idler light is variable with the variation in the wavelength of the pump light. In addition, the input signal is amplified by about 12 dB compared with the case where no pump light is supplied, which means that the power of the idler light becomes equivalent to the power of the signal light.

Embodiment 4

Figure 9A:
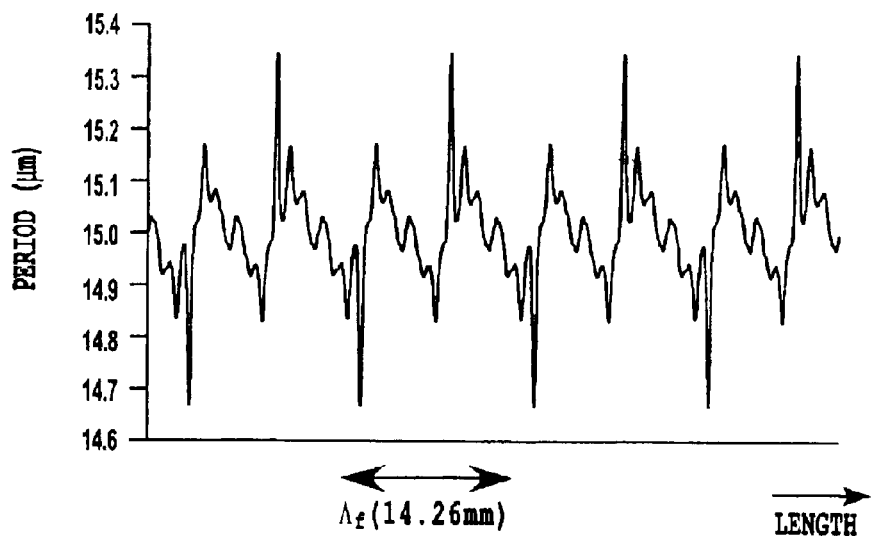
FIG. 9A is a graph illustrating a period variation curve in a modulation structure of a nonlinear optical coefficient used in a fourth embodiment of the wavelength converter in accordance with the present invention.
Figure 9B:
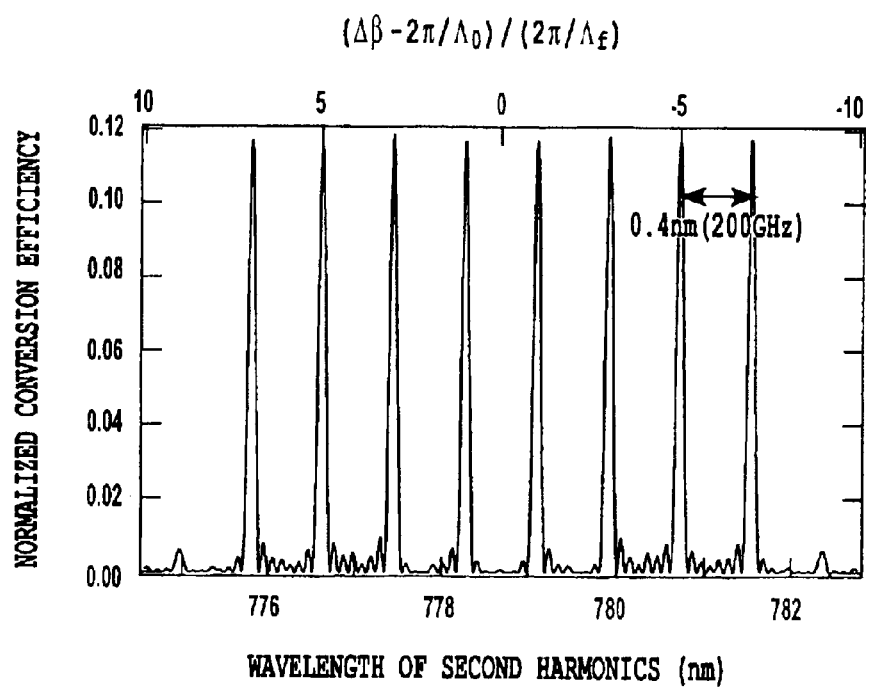
FIG. 9B is a graph illustrating a normalized conversion efficiency obtained when evaluating SHG characteristics by using a wavelength tunable light source in a 1.55 μm band in the fourth embodiment of the wavelength converter in accordance with the present invention.

FIGS. 9A and 9B are graphs illustrating a modulation structure and operation characteristics of a nonlinear optical coefficient of a fourth embodiment of the wavelength converter in accordance with the present invention. FIG. 9A is a graph illustrating a period variation curve in the modulation structure of the nonlinear optical coefficient used in the present embodiment; and FIG. 9B is a graph illustrating a normalized conversion efficiency obtained when evaluating SHG characteristics by using a 1.55 µm band wavelength tunable light source.

In contrast with the first to third embodiments that are configured to be able to cope with four to five pump wavelengths, the present wavelength converter can perform the wavelength conversion using a greater number of pump wavelengths. As illustrated in FIG. 9B, it is configured such that eight odd order peaks become maximum.

In the present embodiment, the fundamental period $\Lambda_0$ of the polarization reversal is 15.5 µm, the total length of the polarization reversal section is 57.04 mm, the repetition period (frequency modulation period) $\Lambda_f$ of the modulation unit structure is 14.26 mm, and the frequency variation pattern is repeated four periods. Accordingly, the number of the polarization reversal structures allotted to one period of the frequency variation pattern is about 920 periods. The present embodiment is configured such that the period of the frequency variation is divided into about 460 subdivisions by every two periods of the polarization reversal structure with the period of about 15.5 µm, and that the maximum conversion efficiency is achieved at the four pump wavelengths by optimizing the period of each polarization reversal structure unit. In addition, as in the period variation curve as illustrated in FIG. 9A, the frequency variation is produced such that the polarization reversal period varies nearly smoothly in one period around the center of 15.5 µm in the wavelength converter of present embodiment.

As illustrated in FIG. 9B, the wavelength converter can produce eight peaks around the wavelength of 778.7 nm at about 0.8 nm spacing, which means that the pump light wavelength is variable at 400 GHz spacing.

The present embodiment can vary the wavelength of the idler light at 3.2 nm spacing when using the 1.55 µm band wavelength light as the signal light and varying the wavelength of the pump light at about 0.4 nm spacing in the neighborhood of 780 nm. Thus, according to the present invention, it is possible to facilitate the design and fabrication of the wavelength converter even when the pump wave length number is very high by designing the frequency variation function appropriately.

Embodiment 5

Figure 10:
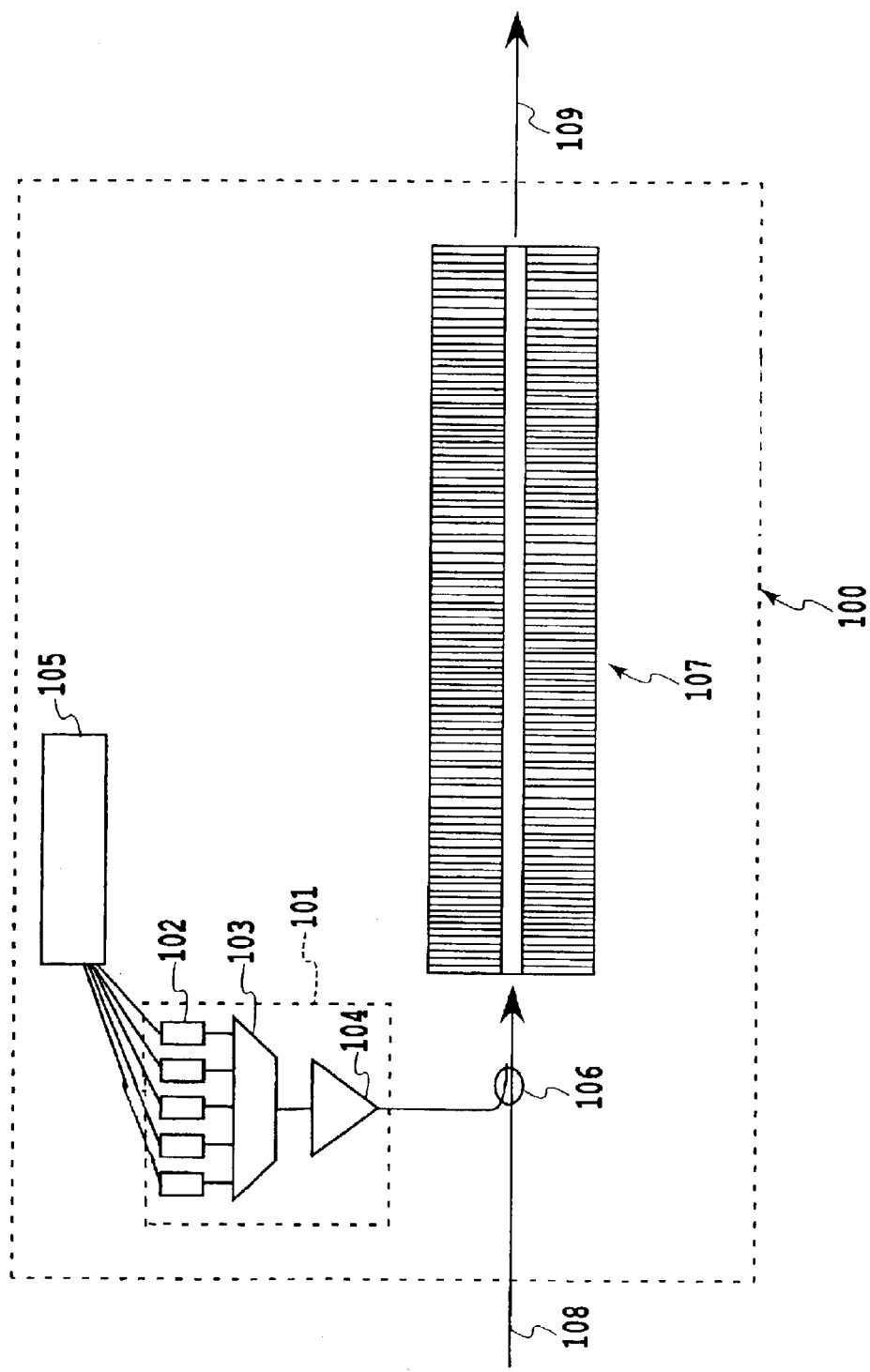
FIG. 10 is a block diagram showing a first configuration of a wavelength converting apparatus including the wavelength converter in accordance with the present invention.

FIG. 10 is a block diagram showing a first configuration of a wavelength converting apparatus with the wavelength converter in accordance with the present invention. The wavelength converting apparatus 100 includes a pump generator 101 that uses five semiconductor lasers, each of which oscillates at different wavelengths in the 1.55 µm band, as pumping sources 102. The laser light beams output from the pumping sources 102 are multiplexed by a multiplexer 103 composed of an arrayed waveguide grating, and then amplified by an Er-doped optical fiber amplifier 104 to be outputs as the pump light. A multiplexer 106 composed of a dielectric multilayer multiplexes signal light 108 with the pump light, and the multiplexed light is incident onto a wavelength converter 107 in accordance with the present invention to emit idler light 109. Incidentally, the present embodiment employs as the wavelength converter 107 a wavelength converter capable of coping with five pump wavelengths as the first embodiment.

The present embodiment adopts a cascade pumping scheme using 1.55 $\mu$m band external pump light. An analogous converter can be configured by preparing five semiconductor lasers each oscillating at different wavelengths in the 0.78 $\mu$m band. In this case, the Er-doped optical fiber amplifier 104 can be omitted, or another semiconductor laser amplifier can be used. In the present embodiment, the semiconductor lasers used as the pumping sources 102 have the wavelengths of 1555.8, 1556.6, 1557.4, 1558.2, and 1559.0 nm at about 0.8 nm spacing.

Selecting one of the semiconductor lasers by a pump wavelength controller 105 to bring it into oscillation enables the wavelength of the idler light to vary at 1.6 nm spacing in the same manner as illustrated in FIG. 6C. Furthermore, oscillating a plurality of semiconductor lasers at the same time makes it possible to simultaneously generate a plurality of idler light beams 109 separated at every 1.6 nm spacing.

Although the present embodiment configures the pump light generator 101 using the plurality of pumping sources, this is not essential. For example, a similar converter can be configured using a single light source with a variable oscillation wavelength, or a light source capable of switching a plurality of wavelengths.

In addition, although the present embodiment employs LiNbO$_3$ as the nonlinear optical material, this is not essential. For example, it is also possible to use second order nonlinear optical materials (such as LiTaO$_3$, KNbO$_3$, KTaO$_3$, Li$_x$K$_{1-x}$Ta$_y$Nb$_{1-y}$O$_3$ oxide crystals like KTP, semiconductors like AlGaAs, and organic materials) whose nonlinear optical coefficient can be reversed or modulated.

Furthermore, although the present embodiment includes the wavelength converter that has the strong optical confinement effect in the nonlinear optical medium and the optical waveguide type structure capable of implementing the long distance interaction in order to achieve the high wavelength conversion efficiency, this is not essential. For example, it can adopt a bulk type device configuration to convert a high power laser wavelength.

Second Configuration of Wavelength Converter

Figures 11A, 11B:
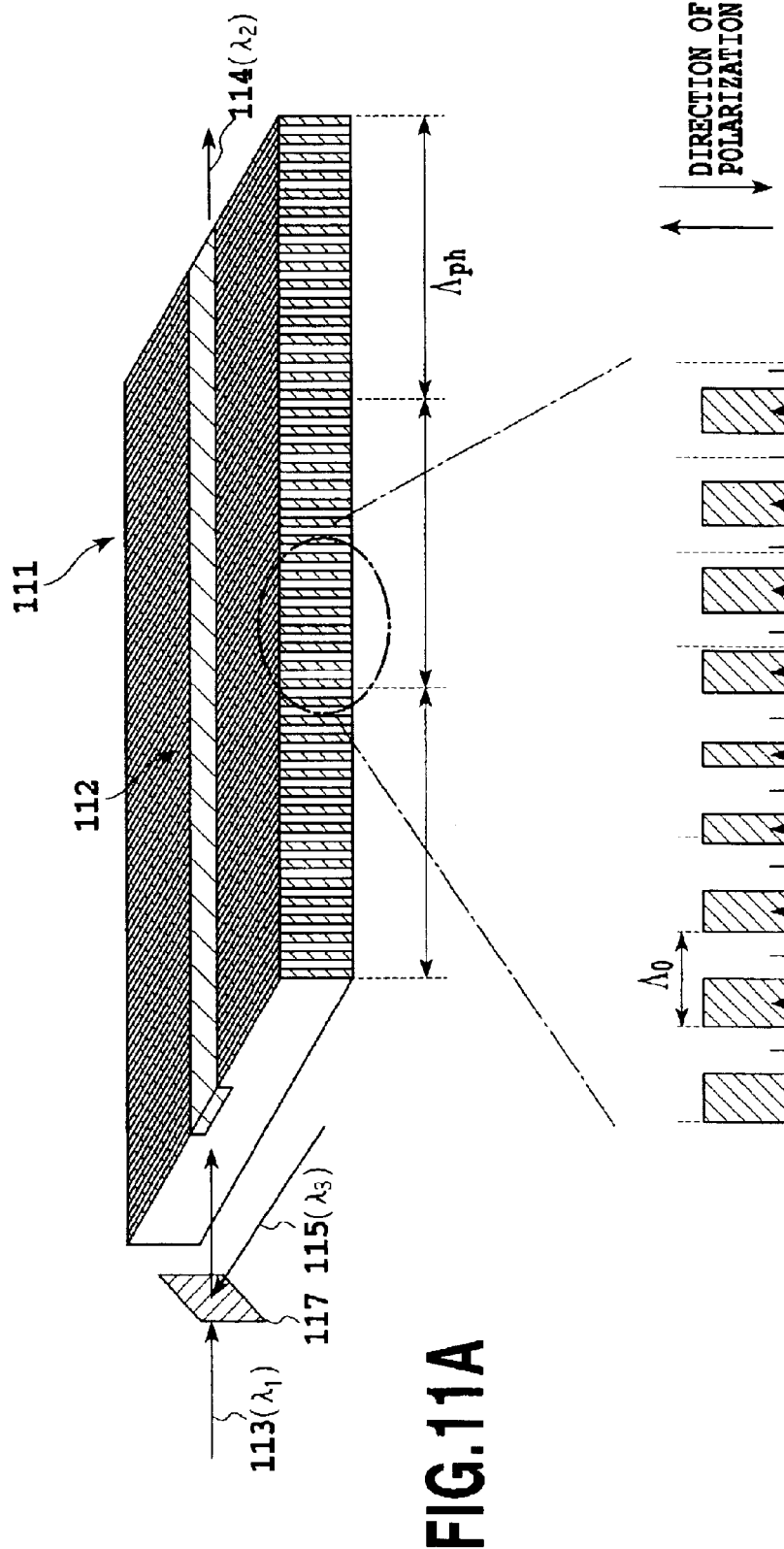
FIGS. 11A and 11B are schematic diagrams showing a second configuration of the wavelength converter in accordance with the present invention.

FIGS. 11A and 11B are schematic diagrams showing a second configuration of the wavelength converter in accordance with the present invention. The following description will be made by way of example of a difference frequency generator that employs as a nonlinear optical medium a ferroelectric crystal material such as LiNbO$_3$ capable of reversing the sign of the nonlinear optical coefficient by reversing the polarization.

As illustrated in FIG. 11A, the difference frequency generator has an optical waveguide 112 formed in a nonlinear optical material substrate 111. It brings about modulation in the nonlinear optical coefficient by periodically reversing the spontaneous polarization of the nonlinear optical medium, and converts the signal light 113 with the wavelength $\lambda_1$ to the idler light (difference frequency light) 114 with the wavelength $\lambda_2$ using the pump light 115 with the wavelength $\lambda_3$.

In the difference frequency generator, the nonlinear optical coefficient is periodically modulated in the longitudinal direction of the nonlinear optical medium just as in the first configuration. However, as illustrated in FIG. 11B, the nonlinear optical coefficient has "phase modulated periodically modulated structure" that is composed of a "modulation unit structure" and a "phase modulation structure". The "modulation unit structure" refers to a structure in which the phase of the periodical modulation of nonlinear optical coefficient varies nearly continuously in the direction of the optical waveguide 112 at every fixed period (fundamental period) $\Lambda_0$. On the other hand, the "phase modulation structure" refers to a structure in which the phase variation of the "modulation unit structure" is repeated at every phase modulation period $\Lambda_{ph}$. Inputting the signal light 113 with the wavelength $\lambda_1$, and pump light 115 with the wavelength $\lambda_3$ to the optical waveguide 112 of the nonlinear optical medium formed on the nonlinear optical material substrate 111 via a multiplexer 117 generates the idler light 14 with the wavelength $\lambda_2$ different from that of the signal light 113 by the second order nonlinear optical effect the pump light 115 brings about in the nonlinear optical medium.

Although FIGS. 11A and 11B show the optical waveguide type structure which has a strong optical confinement effect in the nonlinear optical medium and can achieve long distance interaction, to obtain a high wavelength conversion efficiency, this is not essential. For example, a converter for converting a high power laser wavelength can assume a bulk type structure.

Figure 12A:
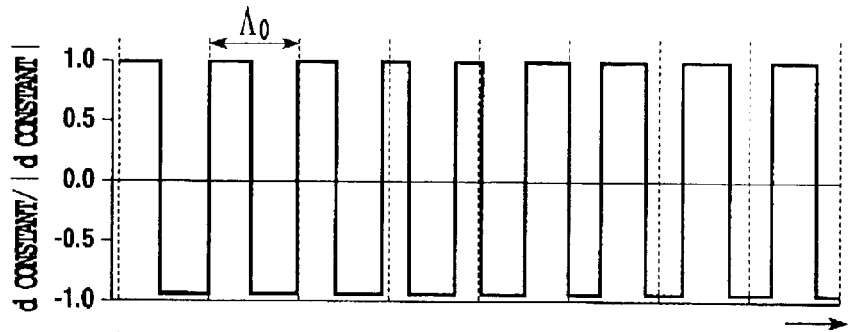
FIGS. 12A–12C are graphs illustrating the detail of a phase modulation structure of a second order nonlinear optical coefficient of a nonlinear optical medium of a difference frequency generator shown in FIG. 11A.
Figure 12B:
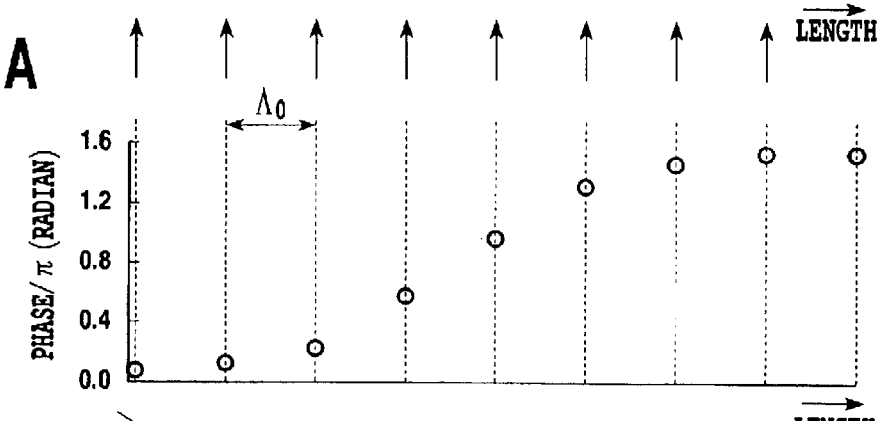
Figure 12C:
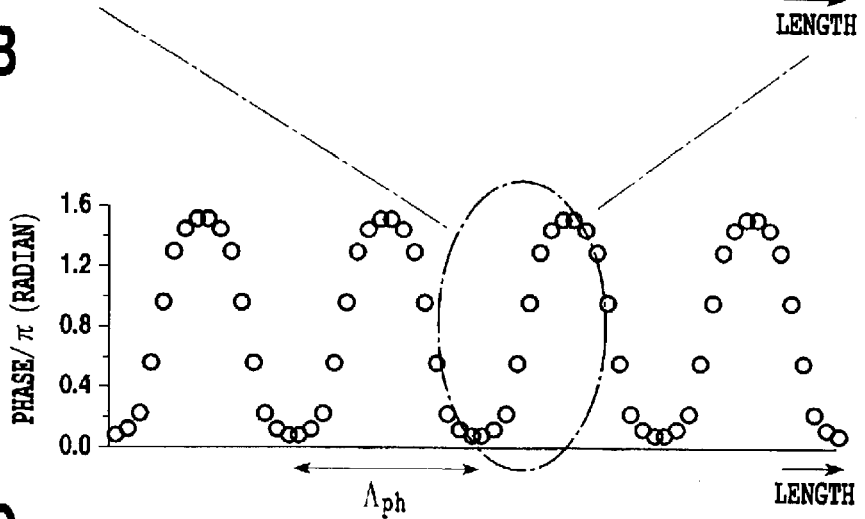

FIGS. 12A–12C are graphs illustrating the details of the modulation unit structure and phase modulation structure in the nonlinear optical medium of the difference frequency generator as shown in FIG. 11A. FIG. 12A illustrates the behavior of the variations in the nonlinear optical coefficient in the longitudinal direction in a part of the phase modulation structure. As illustrated in FIG. 12A, dividing the variations in the nonlinear optical coefficient at every fundamental period $\Lambda_0$ interval exhibits that although the nonlinear optical coefficient is reversed at a uniform period $\Lambda_0$ (from +1 to −1, or from −1 to +1), the initial phase at each period (or at every several periods) varies gradually. FIG. 12B illustrates the phase variation at every fundamental period $\Lambda_0$ illustrated in FIG. 12A.

Imposing the phase modulation to the structure, which advances the phase in the longitudinal direction as in FIG. 12A, will bring about an effect that reduces the period equivalently. On the contrary, the structure which delays the phase in the longitudinal direction will result in an effect that increases the period equivalently. The modulation unit structure of the nonlinear optical coefficient with such phase modulation has a structure that is repeated at a period $\Lambda_{ph}$ longer than the period $\Lambda_0$ as illustrated in FIG. 12C.

Unlike the conventional converter that reverses the phase by 180 degrees, the wavelength converter in accordance with the present invention employs the modulation unit structure in which phase of the periodical modulation varies continuously. The phase modulation periodically modulated structure has the phase variation composed of the phase modulation structure, in which the phase variation in the modulation unit structure is repeated at the period $\Lambda_{ph}$ as shown in FIG. 12C. The wavelength converter is capable of coping with a desired number of pump wavelengths without much losing the conversion efficiency by varying the phase modulation waveform (phase modulation curve) when imposing the phase modulation on the periodical modulation type nonlinear optical material having such a long period repetition structure. Incidentally, the method of determining the phase modulation curve is the same as that of determining the frequency variation curve described before.

FIGS. 13A–13D are graphs illustrating examples of phase modulation curves and the dependence of the conversion efficiency on the phase mismatch amount of the wavelength converter in accordance with the present invention capable of coping with a variety of pump wavelength numbers. In these figures, the conversion efficiency is normalized with respect to the conversion efficiency of a wavelength converter whose a nonlinear medium has the same length but has no phase modulation.

Figure 13A:
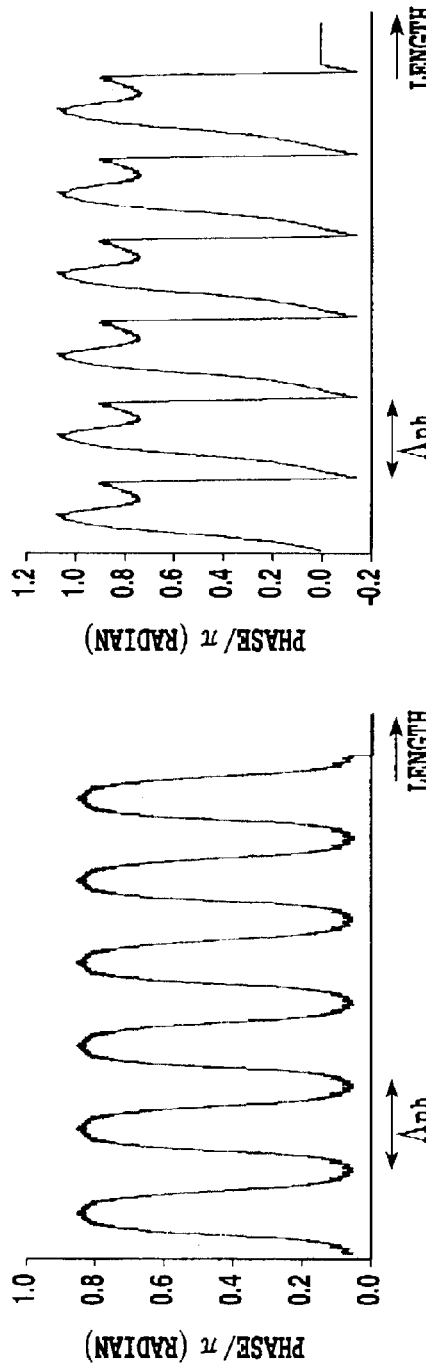
FIGS. 13A–13D are graphs illustrating examples of phase modulation curves and the dependence of the conversion efficiency on the phase mismatch amount of the wavelength converter in accordance with the present invention capable of coping with a variety of pump wavelength numbers.
Figure 13B:
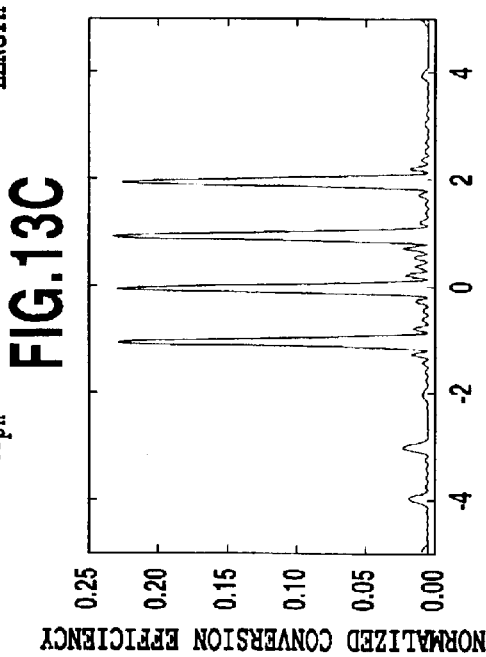

For example, FIGS. 13A and 13B are graphs illustrating the phase variation curve and the dependence of the conversion efficiency on the phase mismatch amount of a wavelength converter corresponding to the three pump light wavelengths, respectively. As compared with the characteristics of the conventional wavelength converter as illustrated in FIGS. 3C and 3D, these figures exhibit that the spurious secondary peaks of the dependence of the conversion efficiency on the phase mismatch amount are reduced, and a conversion efficiency higher than 30% that of the conventional converter is achieved.

The wavelength converter in accordance with the present invention can readily meet the desired number of pump wavelengths by varying the shape of the phase matching curve by appropriately determining the fundamental period $\Lambda_0$ of the "modulation unit structure", the phase modulation period $\Lambda_{ph}$ of the "phase modulation structure", and the phase modulation curve of the "phase modulated periodically modulated structure" composed of the modulation unit structure and phase modulation structure. The method of determining the periods $\Lambda_0$ and $\Lambda_{ph}$ and the phase modulation curve differs depending on the objectivity. However, as described before, any method determines the phase modulation curve in such a manner that the conversion efficiency assumes a local maximum when the phase mismatch amount $\Delta\beta$ takes a particular value determined by the periods $\Lambda_0$ and $\Lambda_{ph}$.

Figure 13C:
Figure 13D:
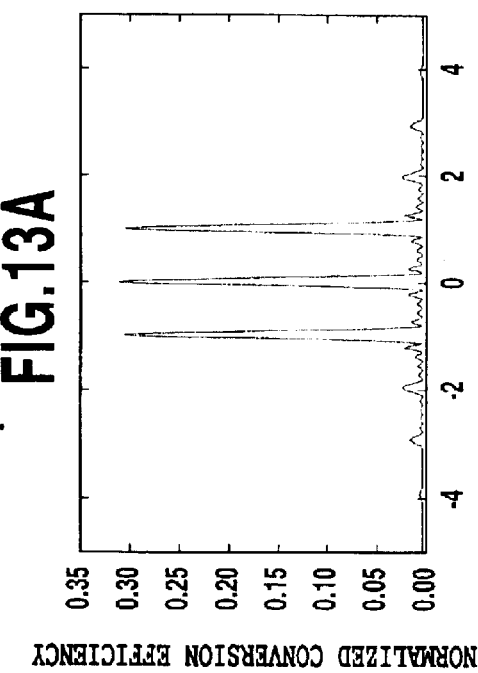

In this case also, assume that the optical waveguide formed in LiNbO$_3$ by the proton exchange method is used as the nonlinear optical medium, that the nonlinear optical coefficient is provided with modulation by periodically reversing the spontaneous polarization of the LiNbO$_3$, and that the period $\Lambda_{ph}$ in FIGS. 13A and 13C is determined at about 14 mm or 28 mm. In this case, the spacing of the available pump wavelengths corresponding to the peaks of the phase matching curve becomes 200 GHz and 100 GHz, respectively. In other words, it can achieve the same pump wavelength spacing by half the repetition period of that of the conventional wavelength converter. As a result, it can be readily placed on a commonly used substrate with a diameter of 3–4 inches.

As described above, the wavelength converter in accordance with the present invention has the "phase modulated periodically modulated structure" which introduces the "phase modulation structure", in which the "modulation unit structure" is repeated at the period $\Lambda_{ph}$, into the period reversal structure of the nonlinear optical coefficient. Here, the "modulation unit structure" has its phase varied nearly continuously in the traveling direction of light within the nonlinear optical medium. Thus, it can cope with a desired number of pump wavelengths. In addition, it can suppress the deterioration of the conversion efficiency, and implement a pump wavelength variable type wavelength converter (and a wavelength converting apparatus using it) that can be configured easily using a practical size of the nonlinear optical material.

Next, a second configuration of the wavelength converter in accordance with the present invention will be described in more detail by way of embodiments 6–10.

Embodiment 6

Figure 14A:
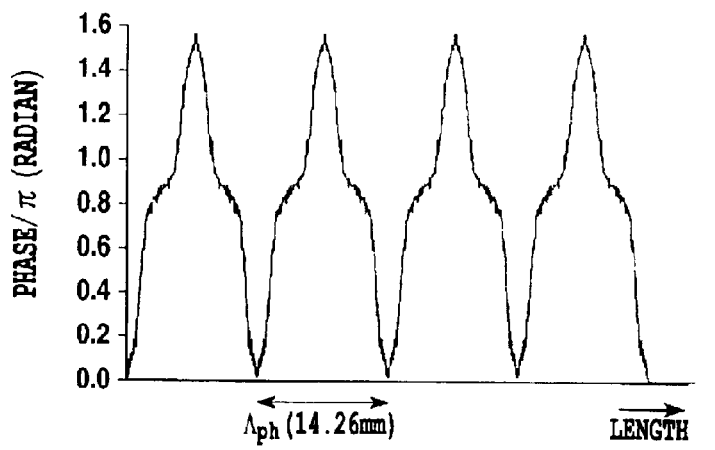
FIGS. 14A–14C are graphs illustrating a variety of characteristics of a sixth embodiment of the wavelength converter in accordance with the present invention.
Figure 14B:
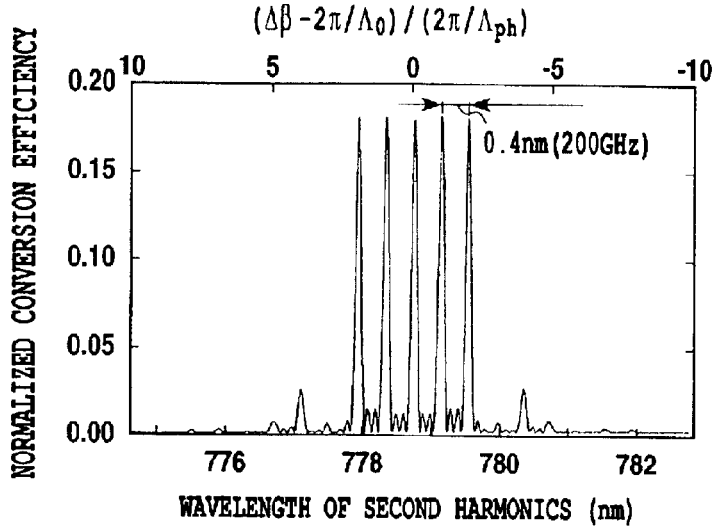
Figure 14C:
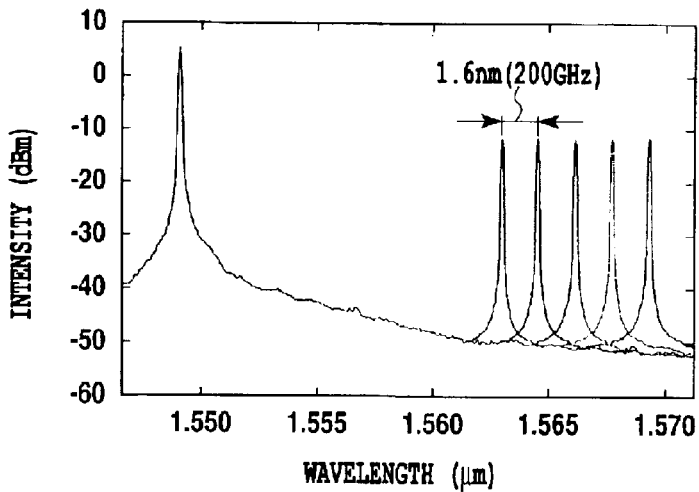

FIGS. 14A–14C are graphs illustrating a variety of characteristics of a sixth embodiment of the wavelength converter in accordance with the present invention. The wavelength converter is configured such that it receives pump light with a wavelength in a 0.78 μm band, and converts signal light with a wavelength in a 1.55 μm band to difference frequency light. Here, FIG. 14A is a graph illustrating a phase modulation curve in the phase modulated periodically modulated structure of the nonlinear optical coefficient used in the present embodiment; FIG. 14B is a graph illustrating a normalized conversion efficiency obtained when evaluating SHG characteristics by using a 1.55 μm band wavelength tunable light source; and FIG. 14C is a graph illustrates spectra of 1.55 μm band idler light.

The wavelength converter uses a Z-cut LiNbO$_3$ substrate (a substrate that is cut perpendicularly to the Z axis). Its polarization reversal section undergoes polarization reversal at a fundamental period $\Lambda_0$ of 15.5 μm by an electric field application method. On the substrate having the polarization reversal in this way, a patterning of SiO$_2$ is made by a photolithography. Then, it is immersed in benzoic acid at a temperature of about 180 degrees, followed by forming an optical waveguide by annealing in an oxygen atmosphere. The wavelength converter is configured such that it can cope with five pump wavelengths.

The polarization reversal section of the wavelength converter has the following structure: The phase modulation period $\Lambda_{ph}$ is made 14.26 mm; its total length is 57.04 mm; the phase modulation pattern is repeated four periods (=57.04 mm/14.26 mm); and the number of the polarization reversal structures allotted to one phase modulation period $\Lambda_{ph}$ is 920 periods (=14.26 mm/15.5 μm). The present embodiment is configured such that the phase modulation period is divided into 460 subdivisions by every two periods of the polarization reversal structure with the period of about 15.5 μm, and that the maximum conversion efficiency is achieved at the five pump wavelengths by optimizing the phase of each polarization reversal structure unit.

The nonlinear optical medium in the wavelength converter is subjected to the phase modulation that varies smoothly from phase zero to about 1.6π during one period in the same manner as the phase modulation curve in the phase modulated periodically modulated structure of the nonlinear optical coefficient as illustrated in FIG. 14A.

As for the LiNbO$_3$ substrate with the polarization reversal structure used in the present embodiment, a photo resist is applied to the +Z plane of the substrate, followed by patterning by the photolithography. Then electrodes are evaporated onto the substrate, and an electric field is applied to the substrate via an electrolyte so that the polarization are reversed in the portions where the electrodes directly touch the substrate. Here, the width of the domain in which the polarization reversal occurs is slightly wider than the width of the electrodes. Accordingly, it is necessary to design a mask used for the photolithography considering the width difference. In the present embodiment, after calculating the ideal phase modulated structure, the mask is designed such that the width of the photo resist becomes wider by an increase in the width of the reversal domain.

The horizontal axis of FIG. 14B represents the wavelength of the 0.78 μm band second harmonics generated by the wavelength converter in the wavelength converting apparatus of the present embodiment. On the other hand, the vertical axis represents the conversion efficiency, which is normalized with respect to the conversion efficiency of a wavelength converter which includes the polarization reversal structure of a uniform period of 15.5 μm in the polarization reversal section with the same length of 57.04 mm. It is possible from the results illustrated in this figure to evaluate the dependence of the conversion efficiency on the wavelength when the 0.78 μm band pump light is input to the wavelength converter to bring about the difference frequency generation.

As illustrated in FIG. 14B, five peaks are obtained around the central wavelength of 778.7 nm at about 0.4 nm spacing, which means that the pump light wavelength is variable at 200 GHz spacing. In addition, it is seen that the conversion efficiency, which is about 18% of that of the converter with the uniform period, is comparable to the conversion efficiency of the conventional wavelength converter with the four wavelengths as illustrated in FIG. 3F although the pump wavelength number is greater.

FIG. 14C illustrates the 1.55 μm band spectra when the wavelength of the signal light is 1548.9 nm, and the wavelength of the pump light is varied as 777.9, 778.3, 778.7, 779.1, and 779.5 nm at about 0.4 nm spacing. It is seen from FIG. 14C that the wavelength of the idler light is variable at 1.6 nm spacing with the variation in the wavelength of the pump light.

Embodiment 7

Figure 15A:
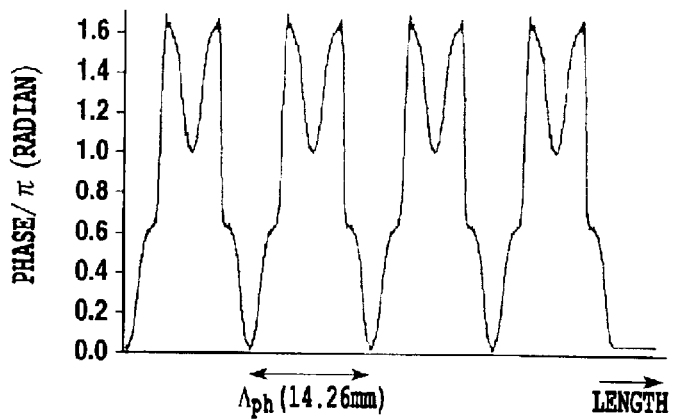
FIG. 15A is a graph illustrating a phase modulation curve in a seventh embodiment of the wavelength converter in accordance with the present invention.
Figure 15B:
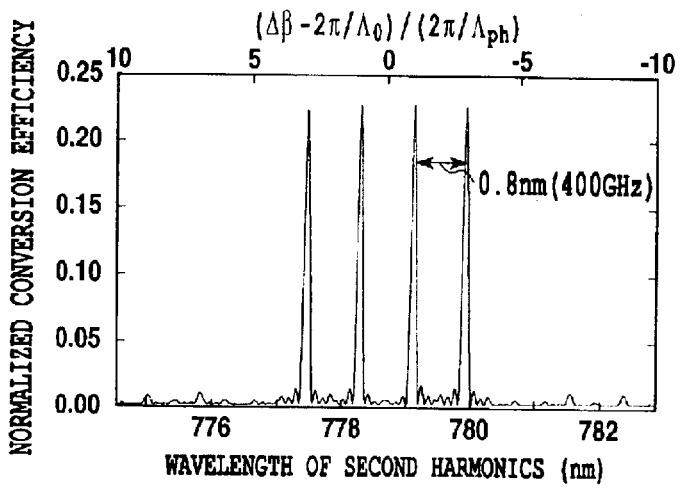
FIG. 15B is a graph illustrating a normalized efficiency obtained when evaluating SHG characteristics by using a wavelength tunable light source in a 1.55 μm band in the seventh embodiment of the wavelength converter in accordance with the present invention.
Figure 15C:
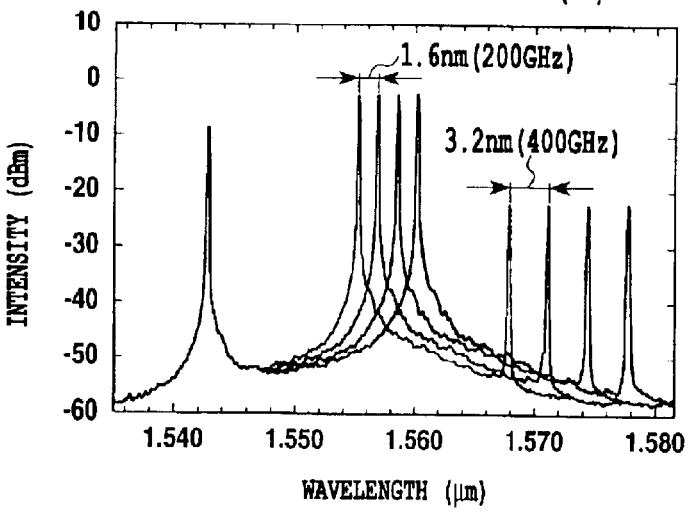
FIG. 15C is a graph illustrates spectra of 1.55 μm band signal, pump, and idler light in the seventh embodiment of the wavelength converter in accordance with the present invention.

FIGS. 15A–15C are graphs illustrating a variety of characteristics of a seventh embodiment of the wavelength converter in accordance with the present invention. FIG. 15A is a graph illustrating a phase modulation curve of the wavelength converter; FIG. 15B is a graph illustrating a normalized efficiency obtained when evaluating SHG characteristics by using a 1.55 μm band wavelength tunable light source; and FIG. 15C is a graph illustrates spectra of 1.55 μm band idler light.

In contrast with the wavelength converter of the sixth embodiment configured to be able to cope with odd numbered pump wavelengths, the wavelength converter of the present embodiment is configured such that it can carry out the wavelength conversion using even numbered pump wavelengths. As seen from FIG. 14B, the configuration of the foregoing sixth embodiment, which provides the fundamental period $\Lambda_0$ of the modulation unit structure with the phase modulation of the period $\Lambda_{ph}$, has the peaks of the conversion efficiency at every $2\pi/\Lambda_{ph}$ interval around the center at which the phase mismatch amount is $2\pi/\Lambda_0$. Accordingly, to achieve the even numbered peaks when the central peak is denoted as a zero order peak, the phase modulation curve should be set in such a manner that only the odd order peaks counted from the central peak are made large, with the even order peaks including the zero order peak being made small.

Thus, the present embodiment is configured as illustrated in FIG. 15B such that the four peaks, that is, +3rd, +1st, −1st, and −3rd peaks, become maximum. Incidentally, in the present embodiment, the fundamental polarization reversal period is about 15.5 μm, the total length of the polarization reversal section is 57.04 mm, the phase modulation period is 14.26 mm, and the phase modulation pattern is repeated four periods Accordingly, the number of the polarization reversal structures allotted to one period of the phase modulation pattern is 920 periods. The present embodiment is configured such that the phase modulation period is divided into 460 subdivisions by every two periods of the polarization reversal structure with the period of about 15.5 μm, and that the maximum conversion efficiency is achieved at the four pump wavelengths by optimizing the period of each polarization reversal structure unit. In addition, as in the phase modulation curve as illustrated in FIG. 15A, the phase modulation is produced such that the phase varies smoothly from zero to about $1.6\pi$ during one period.

As illustrated in FIG. 15B, four peaks are obtained around the central wavelength of 778.7 nm at about 0.8 nm spacing, which means that the pump light wavelength is variable at 400 GHz spacing. In the present embodiment, the phase modulation curve is configured so that the peaks are produced at such a spacing that eliminates the even order peaks. As a result, although it employs the same phase modulation period as that of the sixth embodiment, the peak spacing is doubled. In this way, the present invention can flexibly change the number of peaks and the peak spacing by varying the phase modulation curve.

The conversion efficiency represented by the vertical axis of FIG. 15B is normalized with respect to the conversion efficiency of the wavelength converter which includes the polarization reversal structure of the uniform period of 15.5 μm in the length of 57.04 mm. It is seen from FIG. 15B that the conversion efficiency, which is about 23% of that of the converter with the structure having the polarization reversal of the uniform period, can implement the conversion efficiency of about 1.25 times greater than that of the conventional wavelength converter with the four wavelengths as illustrated in FIG. 3F although the pump wavelength number is the same.

Although the sixth embodiment is an example that receives the pump light in the 0.78 μm band from the outside, and carries out the wavelength conversion in the 1.55 μm band, this is not essential. It can also carry out the so-called cascade pumping that uses a 1.55 μm band light source as external pump light, and generates 0.78 μm band light by the SHG in the nonlinear optical medium to use it as the pump light.

FIG. 15C illustrates the 1.55 μm band spectra when the operation of the wavelength converter in accordance with the present invention is verified by the cascade pumping scheme, and when the wavelength of the signal light is 1542.7 nm, and the wavelength of the pump light is varied as 1559.8, 1558.2, 1556.6, and 1555.0 nm at about 1.6 nm spacing. It is seen from FIG. 15C that the wavelength of the idler light is variable at 3.2 nm spacing with the variation of the wavelength of the pump light.

Embodiment 8

Figure 16A:
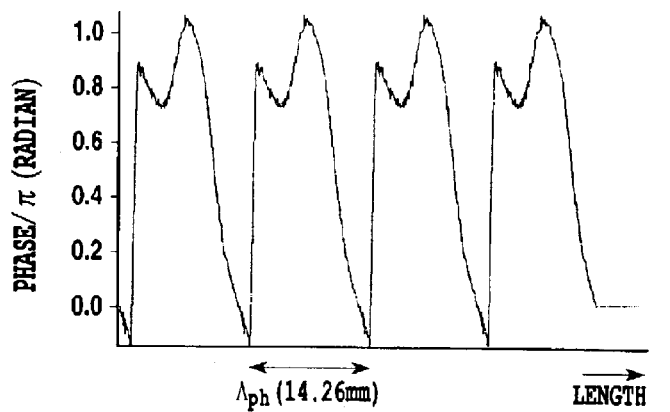
FIG. 16A is a graph illustrating a phase modulation curve in an eighth embodiment of the wavelength converter in accordance with the present invention.
Figure 16B:
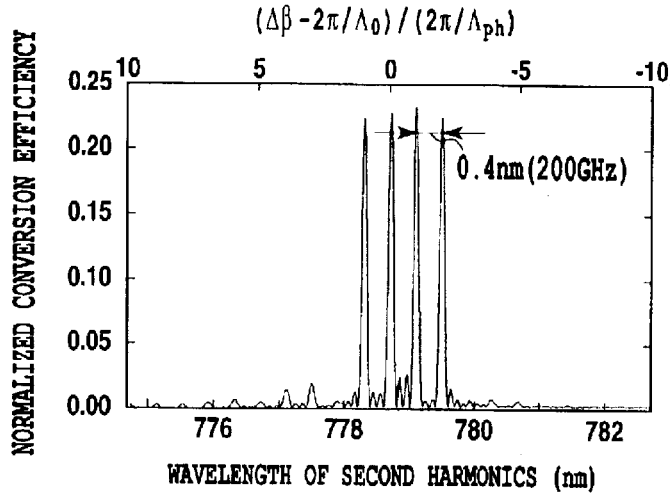
FIG. 16B is a graph illustrating a normalized efficiency obtained when evaluating SHG characteristics by using a wavelength tunable light source in a 1.55 μm band in the eighth embodiment of the wavelength converter in accordance with the present invention.
Figure 16C:
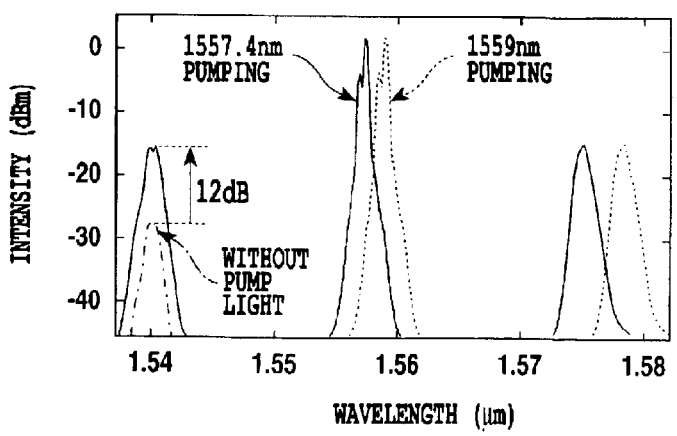
FIG. 16C is a graph illustrates spectra of 1.55 μm band idler light in the eighth embodiment of the wavelength converter in accordance with the present invention.

FIGS. 16A–16C are graphs illustrating a variety of characteristics of an eighth embodiment of the wavelength converter in accordance with the present invention. FIG. 16A is a graph illustrating a phase modulation curve of the wavelength converter; FIG. 16B is a graph illustrating a normalized efficiency obtained when evaluating SHG characteristics by using a 1.55 μm band wavelength tunable light source; and FIG. 16C is a graph illustrates spectra of 1.55 μm band idler light.

The wavelength converter of the foregoing seventh embodiment is configured to be able to cope with the even numbered pump wavelengths. In addition to this competence, the wavelength converter of the present embodiment is configured such that it can shorten the pump light wavelength spacing. Although the phase modulation curve in the seventh embodiment is configured such that the peaks are obtained by removing the even order peaks, this is not essential. For example, to achieve the even numbered peaks, a method is possible which determines the phase modulation curve such that the peaks are obtained asymmetrically around zero order peak including the zero order peak. Thus, the present embodiment is configured as illustrated in FIG. 16B such that the four peaks, that is, zero order, −1st, −2nd, and +1st peaks, become maximum. Incidentally, in the present embodiment, the fundamental period $\Lambda_0$ of the polarization reversal is made 15.5 μm, the total length of the polarization reversal section is 57.04 mm, the phase modulation period is 14.26 mm, and the phase modulation pattern is repeated four periods. Accordingly, the number of the polarization reversal structures allotted to one period of the phase modulation pattern is 920 periods. The present embodiment is configured such that the period of the phase modulation is divided into 460 subdivisions by every two periods of the polarization reversal structures with the period of about 15.5 μm, and that the maximum conversion efficiency is achieved at the four pump wavelengths by optimizing the phase of each polarization reversal structure unit. In addition, as in the phase modulation curve as illustrated in FIG. 16A, the phase modulation is produced such that the phase varies nearly smoothly from −0.1π to about 1.1π in one period.

As illustrated in FIG. 16B, four peaks are obtained around the central wavelength of 778.7 nm at about 0.4 nm spacing, which means that the pump light wavelength is variable at 200 GHz spacing. In the present embodiment, the phase modulation curve is configured so that the four peaks are produced asymmetrically around the zero order peak. As a result, although it employs the same phase modulation period as that of the seventh embodiment, the peak spacing is halved. In this way, the present invention can flexibly change the number of peaks and the peak spacing by varying the phase modulation curve.

The conversion efficiency represented by the vertical axis of FIG. 16B is normalized with respect to the conversion efficiency of the wavelength converter which includes the polarization reversal structure of the uniform period of 15.5 μm in the length of 57.04 mm. It is seen from FIG. 16B that the conversion efficiency, which is about 23% of that of the converter with the structure having the polarization reversal of the uniform period, can implement the conversion efficiency of about 1.25 times greater than that of the conventional wavelength converter with the four wavelengths as illustrated in FIG. 3F although the pump wavelength number is the same.

The present embodiment can vary the wavelength of the idler light at 1.6 nm spacing by using the 1.55 μm band wavelength light as the signal light, and by varying the wavelength of the pump light as 778.3, 778.7, 779.1, and 779.5 nm at about 0.4 nm spacing. Although the present embodiment determines the phase modulation period at 14.26 mm to vary the pump light wavelength at 200 GHz spacing, this is not essential. For example, to halve the spacing between the pump light wavelengths to 100 GHz, it can be configured in the same manner except for doubling the phase modulation period to 28.52 mm. The period enables the wavelength converter to be arranged on a widely used substrate with 3–4 inches in diameter. In this way, according to the present invention, suitably designing the phase modulation function enables a period structure shorter than the conventional one to be able to cope with the narrower pump wavelength spacing such as 100 GHz.

When the power of the pump light incident onto the wavelength converter in accordance with the present invention is large enough, it can not only generate the difference frequency light, but also amplify the input light by the parametric effect. To check it, the present embodiment generates 0.78 μm band light by the SHG within the nonlinear optical medium by using a 1.55 μm band light source as external pump light, and verifies the amplification by a cascade scheme using the 0.78 μm band light as the pump light.

More specifically, the pump light consists of a pump light pulse train with a repetition frequency of 100 MHz and time width of 100 ps, and the signal light consists of a pulse train with a repetition frequency of 100 MHz and time width of 10 ps. The signal light is launched into the converter of the present embodiment in synchronism with the pump light pulse train to verify the amplification.

FIG. 16C illustrates 1.55 μm band spectra obtained when verifying the converter of the present embodiment by the cascade pumping, in which the wavelength of the signal light is 1540.0 nm, and the wavelength of the pump light is varied as 1557.4 and 1559.0 nm. As illustrated in FIG. 16C, the wavelength of the idler light is variable with the variation in the wavelength of the pump light. In addition, the input signal is amplified by about 12 dB compared with the case where no pump light is supplied, which means that the power of the idler light becomes equivalent to the power of the signal light.

Embodiment 9

Figure 17A:
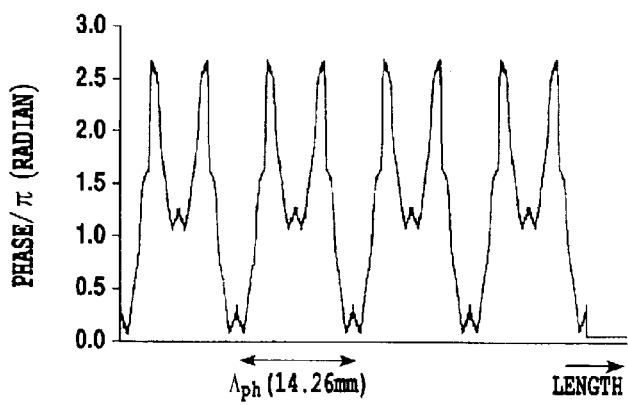
FIG. 17A is a graph illustrating a phase modulation curve in a ninth embodiment of the wavelength converter in accordance with the present invention.
Figure 17B:
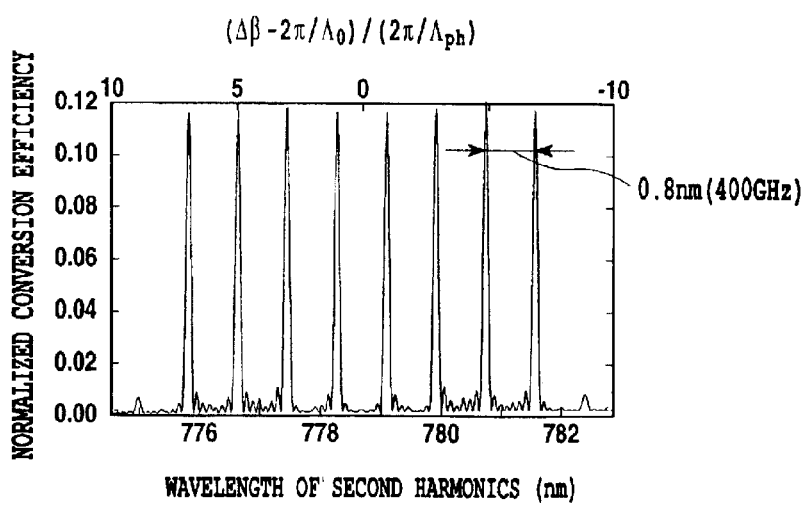
FIG. 17B is a graph illustrating a normalized efficiency obtained when evaluating SHG characteristics by using a wavelength tunable light source in a 1.55 μm band in the ninth embodiment of the wavelength converter in accordance with the present invention.

FIGS. 17A and 17B are graphs illustrating a variety of characteristics of a ninth embodiment of the wavelength converter in accordance with the present invention. FIG. 17A is a graph illustrating a phase modulation curve of the wavelength converter; and FIG. 17B is a graph illustrating a normalized efficiency obtained when evaluating SHG characteristics by using a 1.55 μm band wavelength tunable light source.

In contrast with the sixth to eight embodiments that are configured to be able to cope with four or five pump wavelengths, the present wavelength converter can perform the wavelength conversion using a greater number of pump wavelengths. As illustrated in FIG. 17B, it is configured such that eight odd order peaks become maximum.

In the present embodiment, the fundamental period of the polarization reversal is made 15.5 μm, the total length of the polarization reversal section is 57.04 mm, the phase modulation period is 14.26 mm, and the phase modulation pattern is repeated four periods. Accordingly, the number of the polarization reversal structures allotted to one period of the phase modulation pattern is 920 periods. The present embodiment is configured such that the period of the phase modulation is divided into 460 subdivisions by every two periods of the polarization reversal structure with the period of about 15.5 μm, and that the maximum conversion efficiency is achieved at the four pump wavelengths by optimizing the period of each polarization reversal structure unit. In addition, as in the phase modulation curve as illustrated in FIG. 17A, the phase modulation is produced such that the phase varies nearly smoothly from zero to about 2.7π in one period. As illustrated in FIG. 17B, the wavelength converter can produce eight peaks around the wavelength of 778.7 nm at about 0.8 nm spacing, which means that the pump light wavelength is variable at 400 GHz spacing.

The present embodiment can vary the wavelength of the idler light at 3.2 nm spacing when using the 1.55 μm band wavelength light as the signal light and varying the wavelength of the pump light at about 0.4 nm spacing in the neighborhood of 780 nm. Thus, according to the present invention, it is possible to facilitate the design and fabrication of the wavelength converter even when the pump wavelength number is very high by designing the phase modulation function appropriately.

Embodiment 10

Figure 18:
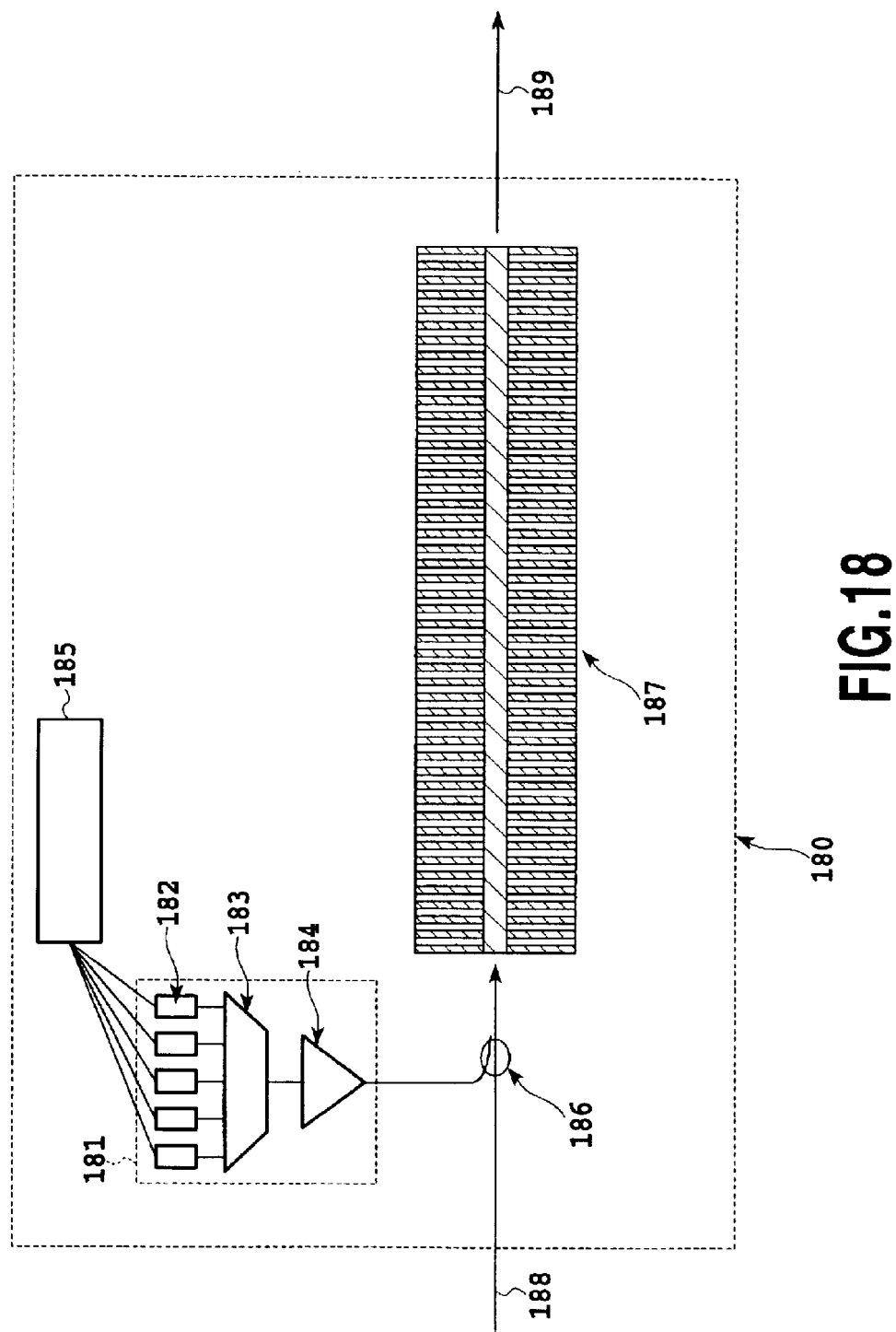
FIG. 18 is a block diagram showing a configuration of a wavelength converting apparatus including the wavelength converter in accordance with the present invention.

FIG. 18 is a block diagram showing a configuration of a wavelength converting apparatus with the wavelength converter in accordance with the present invention. The wavelength converting apparatus 180 includes a pump generator 181 that uses five semiconductor lasers each oscillating at different wavelengths in the 1.55 μm band as pumping sources 182. The laser light beams output from the pumping sources 182 are multiplexed by a multiplexer 183 composed of an arrayed waveguide grating, and then amplified by an Er-doped optical fiber amplifier 184 to be outputs as the pump light. The signal light 188 and pump light are multiplexed by a multiplexer 186 composed of a dielectric multilayer, and are incident onto the wavelength converter 187 in accordance with the present invention to emit idler light 189. Incidentally, the present embodiment employs as the wavelength converter 187 a wavelength converter capable of coping with five pump wavelengths as the first embodiment.

The present embodiment adopts a cascade pumping scheme using 1.55 μm band external pump light. An analogous converter can be configured by preparing five semiconductor lasers each oscillating at different wavelengths in the 0.78 μm band. In this case, the Er-doped optical fiber amplifier 184 can be omitted, or another semiconductor laser amplifier can be used. In the present embodiment, the semiconductor lasers used as the pumping sources 182 have the wavelengths of 1555.8, 1556.6, 1557.4, 1558.2, and 1559.0 nm at about 0.8 nm spacing.

Selecting one of the semiconductor lasers by a pump wavelength controller 185 to bring it into oscillation enables the wavelength of the idler light to vary at 1.6 nm spacing in the same manner as illustrated in FIG. 14C. Furthermore, oscillating a plurality of semiconductor lasers at the same time makes it possible to simultaneously generate a plurality of idler light beams 189 separated at every 1.6 nm spacing.

Although the present embodiment configures the pump light generator 181 using the plurality of pumping sources, this is not essential. For example, a similar converter can be configured using a single light source with a variable oscillation wavelength, or a light source capable of switching a plurality of wavelengths.

In addition, although the present embodiment employs LiNbO$_3$ as the nonlinear optical material, this is not essential. For example, it is also possible to use second order nonlinear optical materials (such as LiTaO$_3$, KNbO$_3$, KTaO$_3$, Li$_x$K$_{1-x}$Ta$_y$Nb$_{1-y}$O$_3$ oxide crystals like KTP, semiconductors like AlGaAs, and organic materials) whose nonlinear optical coefficient can be reversed or modulated.

Furthermore, although the present embodiment includes the wavelength converter that has the strong optical confinement effect in the nonlinear optical medium and the optical waveguide type structure capable of implementing the long distance interaction in order to achieve the high wavelength conversion efficiency, this is not essential. For example, it can adopt a bulk type device configuration to convert a high power laser wavelength.

The first and second configurations of the wavelength converter in accordance with the present invention are described by way of example of the difference frequency generator that has the nonlinear optical medium in the wavelength converter receive the two light beams with different wavelengths, the signal light and pump light, and outputs the idler light with the wavelength different from the wavelength of the two input light beams. However, a different type of the incident light or outgoing light is also applicable. For example, a configuration is also possible that inputs one or two light beams with the wavelengths among the three wavelengths ($\lambda_1$, $\lambda_2$ and $\lambda_3$ including the case where $\lambda_1=\lambda_2$) satisfying the following equation, and converts the input light to the light with one of the three wavelengths, which differs from at least one of the wavelengths of the input light.

$$\frac{1}{\lambda_3} = \frac{1}{\lambda_1} + \frac{1}{\lambda_2} \tag{7}$$

For example, a wavelength converter with such a configuration is possible that inputs the light beams with the wavelengths $\lambda_1$, and $\lambda_2$, and outputs the light with the wavelength $\mu_3$ corresponding to the sum frequency, or that inputs two light beams satisfying the relationship of $\lambda_1=\lambda_2$, and outputs the light with the wavelength $\lambda_3=2\lambda_1$ corresponding to the second harmonics. According to the present invention, these configurations can also vary the wavelength of the incident light, thereby being able to carry out the wavelength conversion of the outgoing light.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A wavelength converter comprising:
   a nonlinear optical medium having a frequency modulated periodically modulated structure composed of a modulation unit structure and a frequency modulation structure, the modulation unit structure having a structure in which a modulation period of a nonlinear optical coefficient varies nearly continuously at a period substantially equal to a fundamental period $\Lambda_0$ in a traveling direction of light, and the frequency modulation structure having a structure in which the modulation unit structure is repeated at a frequency modulation period $\Lambda_f$ longer than the fundamental period $\Lambda_0$; and
   means for launching light with one or two wavelengths of three wavelengths $\lambda_1$, $\lambda_2$ and $\lambda_3$ including $\lambda_1=\mu_2$, which satisfy the following equation, onto said nonlinear optical medium, $$\frac{1}{\lambda_3} = \frac{1}{\lambda_1} + \frac{1}{\lambda_2}$$

wherein
   said wavelength converter, utilizing a second order nonlinear optical effect occurring in said nonlinear optical medium, converts the input light into outgoing light with a wavelength equal to one of the three wavelengths, and different from at least one of the wavelengths of the incident light.

2. A wavelength converting apparatus comprising a pumping source capable of varying its oscillation wavelength or switching a plurality of oscillation wavelengths, and a wavelength converter as defined in claim 1, wherein said wavelength converter is configured such that it
   generates difference frequency light in said nonlinear optical medium from input signal light supplied from outside, and incident light supplied from said pumping source; and
   converts a wavelength of the difference frequency light by selecting the wavelength of the pump light with a phase mismatch amount that will maximize a generation efficiency of the difference frequency light.

3. The wavelength converter as claimed in claim 1, wherein the fundamental period $\Lambda_0$ and the frequency modulation period $\Lambda_f$, and a frequency variation curve of the frequency modulated periodically modulated structure are determined such that a conversion efficiency becomes maximum when a phase mismatch amount $\Delta\beta$ given by the following equation is equal to $2\pi/\Lambda_0 \pm 2\pi i/\Lambda_f$ (i=0, 1, ..., n, where n is a positive integer), $$\Delta\beta = 2\pi \cdot \left(\frac{n_3}{\lambda_3} - \frac{n_2}{\lambda_2} - \frac{n_1}{\lambda_1}\right)$$

where $n_1$, $n_2$ and $n_3$ are refractive indices of the nonlinear optical medium for the three wavelengths ($\lambda_1$, $\lambda_2$, $\lambda_3$) associated with the wavelength conversion in said nonlinear optical medium.

4. A wavelength converting apparatus comprising a pumping source capable of varying its oscillation wavelength or switching a plurality of oscillation wavelengths, and a wavelength converter as defined in claim 3, wherein said wavelength converter is configured such that it generates difference frequency light in said nonlinear optical medium from input signal light supplied from outside, and incident light supplied from said pumping source; and converts a wavelength of the difference frequency light by selecting the wavelength of the pump light with a phase mismatch amount that will maximize a generation efficiency of the difference frequency light.

5. The wavelength converter as claimed in claim 1, wherein the fundamental period $\Lambda_0$ and the frequency modulation period $\Lambda_f$, and a frequency variation curve of the frequency modulated periodically modulated structure are determined such that a conversion efficiency becomes maximum when a phase mismatch amount $\Delta\beta$ given by the following equation is equal to $2\pi/\Lambda_0 \pm 2\pi (2i+1)/\Lambda_f$ (i=0, 1, ..., n, where n is a positive integer), $$\Delta\beta = 2\pi \cdot \left(\frac{n_3}{\lambda_3} - \frac{n_2}{\lambda_2} - \frac{n_1}{\lambda_1}\right)$$

where $n_1$, $n_2$ and $n_3$ are refractive indices of the nonlinear optical medium for the three wavelengths ($\lambda_1$, $\lambda_2$, $\lambda_3$) associated with the wavelength conversion in said nonlinear optical medium.

6. A wavelength converting apparatus comprising a pumping source capable of varying its oscillation wavelength or switching a plurality of oscillation wavelengths, and a wavelength converter as defined in claim 5, wherein said wavelength converter is configured such that it generates difference frequency light in said nonlinear optical medium from input signal light supplied from outside, and incident light supplied from said pumping source; and converts a wavelength of the difference frequency light by selecting the wavelength of the pump light with a phase mismatch amount that will maximize a generation efficiency of the difference frequency light.

7. The wavelength converter as claimed in claim 1, wherein the fundamental period $\Lambda_0$ and the frequency modulation period $\Lambda_f$, and a frequency variation curve of the frequency modulated periodically modulated structure are determined such that a conversion efficiency becomes maximum when a phase mismatch amount $\Delta\beta$ given by the following equation is equal to $2\pi/\Lambda_0 \pm 2\pi i/\Lambda_f$ (i=m, m+1, ..., n, where m and n are positive or negative integers satisfying $|m| \neq |n|$), $$\Delta\beta = 2\pi \cdot \left(\frac{n_3}{\lambda_3} - \frac{n_2}{\lambda_2} - \frac{n_1}{\lambda_1}\right)$$

where $n_1$, $n_2$ and $n_3$ are refractive indices of the nonlinear optical medium for the three wavelengths ($\lambda_1$, $\lambda_2$, $\lambda_3$) associated with the wavelength conversion in said nonlinear optical medium.

8. A wavelength converting apparatus comprising a pumping source capable of varying its oscillation wavelength or switching a plurality of oscillation wavelengths, and a wavelength converter as defined in claim 7, wherein said wavelength converter is configured such that it generates difference frequency light in said nonlinear optical medium from input signal light supplied from outside, and incident light supplied from said pumping source; and converts a wavelength of the difference frequency light by selecting the wavelength of the pump light with a phase mismatch amount that will maximize a generation efficiency of the difference frequency light.

9. A wavelength converter comprising:

a nonlinear optical medium having a phase modulated periodically modulated structure composed of a modulation unit structure and a phase modulation structure, the modulation unit structure having a structure in which a nonlinear optical coefficient is periodically modulated at a period substantially equal to a fundamental period $\Lambda_0$ and the phase of the modulation varies nearly continuously, and the phase modulation structure having a structure in which the phase variation of the modulation unit structure is repeated at a phase modulation period $\Lambda_{ph}$ longer than the fundamental period $\Lambda_0$; and means for launching light with one or two wavelengths of three wavelengths $\lambda_1$, $\lambda_2$ and $\mu_3$ including $\lambda_1 = \lambda_2$, which satisfy the following equation, onto said nonlinear optical medium, $$\frac{1}{\lambda_3} = \frac{1}{\lambda_1} + \frac{1}{\lambda_2}$$

wherein said wavelength converter, utilizing a second order nonlinear optical effect occurring in said nonlinear optical medium, converts the input light into outgoing light with a wavelength equal to one of the three wavelengths, and different from at least one of the wavelengths of the incident light.

10. A wavelength converting apparatus comprising a pumping source capable of varying its oscillation wavelength or switching a plurality of oscillation wavelengths, and a wavelength converter as defined in claim 9, wherein said wavelength converter is configured such that it generates difference frequency light in said nonlinear optical medium from input signal light supplied from outside, and incident light supplied from said pumping source; and converts a wavelength of the difference frequency light by selecting the wavelength of the pump light with a phase mismatch amount that will maximize a generation efficiency of the difference frequency light.

11. The wavelength converter as claimed in claim 9, wherein the fundamental period $\Lambda_0$ and the phase modulation period $\Lambda_{ph}$, and a phase variation curve of the phase modulated periodically modulated structure are determined such that a conversion efficiency becomes maximum when a phase mismatch amount $\Delta\beta$ given by the following equation is equal to $2\pi/\Lambda_0 \pm 2\pi i/\Lambda_{ph}$ (i=0, 1, ..., n, where n is a positive integer), $$\Delta\beta = 2\pi \cdot \left( \frac{n_3}{\lambda_3} - \frac{n_2}{\lambda_2} - \frac{n_1}{\lambda_1} \right)$$

where $n_1$, $n_2$ and $n_3$ are refractive indices of the nonlinear optical medium for the three wavelengths ($\lambda_1$, $\lambda_2$, $\lambda_3$) associated with the wavelength conversion in said nonlinear optical medium.

12. A wavelength converting apparatus comprising a pumping source capable of varying its oscillation wavelength or switching a plurality of oscillation wavelengths, and a wavelength converter as defined in claim 11, wherein said wavelength converter is configured such that it generates difference frequency light in said nonlinear optical medium from input signal light supplied from outside, and incident light supplied from said pumping source; and converts a wavelength of the difference frequency light by selecting the wavelength of the pump light with a phase mismatch amount that will maximize a generation efficiency of the difference frequency light.

13. The wavelength converter as claimed in claim 9, wherein the fundamental period $\Lambda_0$ and the phase modulation period $\Lambda_{ph}$, and a phase variation curve of the phase modulated periodically modulated structure are determined such that a conversion efficiency becomes maximum when a phase mismatch amount $\Delta\beta$ given by the following equation is equal to $2\pi/\Lambda_0 \pm 2\pi(2i+1)/\Lambda_{ph}$ (i=0, 1, ..., n, where n is a positive integer), $$\Delta\beta = 2\pi \cdot \left( \frac{n_3}{\lambda_3} - \frac{n_2}{\lambda_2} - \frac{n_1}{\lambda_1} \right)$$

where $n_1$, $n_2$ and $n_3$ are refractive indices of the nonlinear optical medium for the three wavelengths ($\lambda_1$, $\lambda_2$, $\lambda_3$) associated with the wavelength conversion in said nonlinear optical medium.

14. A wavelength converting apparatus comprising a pumping source capable of varying its oscillation wavelength or switching a plurality of oscillation wavelengths, and a wavelength converter as defined in claim 13, wherein said wavelength converter is configured such that it generates difference frequency light in said nonlinear optical medium from input signal light supplied from outside, and incident light supplied from said pumping source; and converts a wavelength of the difference frequency light by selecting the wavelength of the pump light with a phase mismatch amount that will maximize a generation efficiency of the difference frequency light.

15. The wavelength converter as claimed in claim 9, wherein the fundamental period $\Lambda_0$ and the phase modulation period $\Lambda_{ph}$, and a phase variation curve of the phase modulated periodically modulated structure are determined such that a conversion efficiency becomes maximum when a phase mismatch amount $\Delta\beta$ given by the following equation is equal to $2\pi/\Lambda_0 + 2\pi i/\Lambda_{ph}$ (i=m, m+1, ..., n, where m and n are positive or negative integers satisfying $|m| \neq |n|$), $$\Delta\beta = 2\pi \cdot \left( \frac{n_3}{\lambda_3} - \frac{n_2}{\lambda_2} - \frac{n_1}{\lambda_1} \right)$$

where $n_1$, $n_2$ and $n_3$ are refractive indices of the nonlinear optical medium for the three wavelengths ($\lambda_1$, $\lambda_2$, $\lambda_3$) associated with the wavelength conversion in said nonlinear optical medium.

16. A wavelength converting apparatus comprising a pumping source capable of varying its oscillation wavelength or switching a plurality of oscillation wavelengths, and a wavelength converter as defined in claim 15, wherein said wavelength converter is configured such that it generates difference frequency light in said nonlinear optical medium from input signal light supplied from outside, and incident light supplied from said pumping source; and converts a wavelength of the difference frequency light by selecting the wavelength of the pump light with a phase mismatch amount that will maximize a generation efficiency of the difference frequency light.

* * * * *

UNITED STATES PATENT AND TRADEMARK OFFICE
CERTIFICATE OF CORRECTION

PATENT NO. : 6,806,986 B2
DATED : October 19, 2004
INVENTOR(S) : Asobe et al.

It is certified that error appears in the above-identified patent and that said Letters Patent is hereby corrected as shown below:

Column 1,
Line 7, change "hereinto" to -- herein --.

Column 2,
Line 17, after "periodically" change "reversing" to -- reverse --.
Line 53, after "mismatch amount" change "Δ62" to -- Δβ --.

Column 3,
Line 2, change "narrow of about" to -- narrow, about --.
Line 3, after "in terms of" insert -- a --.
Line 34, before "illustrating" change "diagram" to -- diagrams --.
Line 39, after "wavelength converter" change ";" to -- , --.

Column 4,
Line 24, change "{(2/$\Lambda_o$)-" to -- {(2π/$\Lambda_o$)- --.
Line 55, before "in FIG. 3F" change "illustrate" to -- illustrated --.

Column 5,
Line 9, change "much losing the" to -- losing much --.
Line 18, before "pump light" remove "the".
Line 29, before "nearly continuously," change "varies" to -- varying --.
Line 55, change "$\Lambda_o$ modulations varies" to -- $\Lambda_o$, modulations varying --.

Column 6,
Line 10, after "pumping source" change ";" to -- , --.
Line 28, after "Δβ" change "maybe" to -- may be --.
Line 32, change "$2\pi/\Lambda_o \pm 2\pi i/\Lambda_{ph}$," to -- $2\pi/\Lambda_o + 2\pi i/\Lambda_{ph}$ --.
Line 33, after "|m|≠|n|." insert -- ) --.

Column 7,
Lines 14, 27 and 40, before "illustrates" insert -- which --.

Column 8,
Lines 15 and 27, before "illustrates" insert -- which --.
Line 49, after "used in the" change "instant" to -- present --.
Line 59, before "of example" change "byway" to -- by way --.

Column 9,
Lines 1-2, change "to the outgoing light with the" to -- the outgoing light to --.
Line 22, after "(FIG. 4A)" insert -- . --.

UNITED STATES PATENT AND TRADEMARK OFFICE
CERTIFICATE OF CORRECTION

PATENT NO. : 6,806,986 B2
DATED : October 19, 2004
INVENTOR(S) : Asobe et al.

It is certified that error appears in the above-identified patent and that said Letters Patent is hereby corrected as shown below:

Column 9 (cont'd),
Line 23, change "that" to -- That --.
Lines 30-31, after "multiplexer 47" insert -- , --.
Line 31, after "wavelength $\lambda_2$" insert -- , --.
Line 32, after "signal light" change "43 by" to -- 43. This is due to --.

Column 10,
Line 6, before "varying the frequency" change "with" to -- by --.
Line 18, before "j-th peak," insert -- the --.
Line 25, after "numbers," change "discovers" to -- have found --.
Line 46, after "FIG. 3D," change "with" to -- while --.
Line 64, after "a first method" change "determines" to -- is determined --.
Line 67, after "A second method" change "determines" to -- is determined --.

Column 11,
Line 4, before "such that the conversion" change "determines" to -- is determined --.
Line 27, after "phase matching curve" change "becomes" to -- become --.
Line 59, before "difference frequency light." insert -- a --.
Line 65, before "illustrates spectra" insert -- which --.

Column 12,
Line 19, after "pattern is repeated" insert -- over --.
Line 39, after "polarization" change "are" to -- is --.

Column 13,
Line 20, after "is a graph" insert -- which --.
Line 48, after "pattern is repeated" insert -- over --.
Line 66, change "eliminates the even order peaks." to -- the even order peaks are eliminated. --.

Column 14,
Line 44, before "illustrates spectra" insert -- which --.
Line 49, before "the wavelength converter" change "competence," to -- feature of the present invention, --.
Line 57, before "zero order peak" insert -- the --.
Line 66, after "pattern is repeated" insert -- over --.

Column 16,
Line 34, after "pattern is repeated" insert -- over --.

UNITED STATES PATENT AND TRADEMARK OFFICE
CERTIFICATE OF CORRECTION

PATENT NO. : 6,806,986 B2
DATED : October 19, 2004
INVENTOR(S) : Asobe et al.

It is certified that error appears in the above-identified patent and that said Letters Patent is hereby corrected as shown below:

Column 17,
Line 4, after "amplifier 104 to be" change "outputs" to -- output --.
Line 11, after "five pump" change "wavelengths as the" to -- wavelengths, as in --.
Line 39, before "oxide crystals like KTP," insert -- , --.
Line 41, after "linear optical" change "coefficient" to -- coefficients --.

Column 18,
Line 9, before "nonlinear optical" insert -- the --.
Line 19, after "idler light" change "14" to -- 114 --.
Line 38, after "exhibits that" insert -- , --.
Line 56, after "structure in which" insert -- the --.
Line 63, change "much losing the" to -- losing much of the --.

Column 19,
Line 10, before "nonlinear medium" remove "a".

Column 20,
Line 18, before "illustrates spectra of" insert -- which --.
Line 33, after "pattern is repeated" insert -- over --.
Line 54, after "the polarization" change "are" to -- is --.

Column 21,
Line 35, before "illustrates spectra" insert -- which --.
Line 60, after "pattern is repeated" insert -- over --.
Line 61, change "periods Accordingly," to -- periods. Accordingly, --.

Column 22,
Line 11, change "eliminates the even order peaks." to -- the even order peaks are eliminated. --.
Line 54, before "illustrates spectra" insert -- which --.
Line 59, change "competence," to -- feature of the present invention, --.
Line 67, before "zero order peak" insert -- the --.

Column 23,
Line 8, after "pattern is repeated" insert -- order --.
Line 39, after "can implement" change "the" to -- a --.

Column 24,
Line 41, after "is repeated" insert -- over --.

UNITED STATES PATENT AND TRADEMARK OFFICE
CERTIFICATE OF CORRECTION

PATENT NO. : 6,806,986 B2
DATED : October 19, 2004
INVENTOR(S) : Asobe et al.

It is certified that error appears in the above-identified patent and that said Letters Patent is hereby corrected as shown below:

Column 25,
Line 11, after "amplifier 184 to be" change "outputs" to -- output --.
Line 18, change "wavelengths as the" to -- wavelengths, as in the --.
Line 47, before "oxide crystals like KTP," insert -- , --.
Line 49, after "linear optical" change "coefficient" to -- coefficients --.
Line 60, before "the difference frequency" change "of" to -- as --.
Line 62, after "wavelength converter" change "receive" to -- receives --.

Column 26,
Line 14, after "wavelength" change "$\mu_3$" to -- $\lambda_3$ --.
Line 42, change "$\lambda_1 = \mu_2$," to -- $\lambda_1 = \lambda_2$, --.

Column 28,
Line 40, after "$\lambda_1, \lambda_2$ and" change "$\mu_3$" to -- $\lambda_3$ --.

Signed and Sealed this

Sixth Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,806,986 B2
APPLICATION NO. : 10/456073
DATED : October 19, 2004
INVENTOR(S) : Asobe et al.

It is certified that error appears in the above-identified patent and that said Letters Patent is hereby corrected as shown below:

Column 1,
Line 7, change "hereinto" to -- herein --.

Column 2,
Line 17, after "periodically" change "reversing" to -- reverse --.
Line 53, after "mismatch amount" change "$\Delta 62$" to -- $\Delta\beta$ --.

Column 3,
Line 2, change "narrow of about" to -- narrow, about --.
Line 3, after "in terms of" insert -- a --.
Line 34, before "illustrating" change "diagram" to -- diagrams --.
Line 39, after "wavelength converter" change ";" to -- , --.

Column 4,
Line 24, change "$\{(2/\Lambda_o)$-" to -- $\{(2\pi/\Lambda_o)$- --.
Line 55, before "in FIG. 3F" change "illustrate" to -- illustrated --.

Column 5,
Line 9, change "much losing the" to -- losing much --.
Line 18, before "pump light" remove "the".
Line 29, before "nearly continuously," change "varies" to -- varying --.
Line 55, change "$\Lambda_o$ modulations varies" to -- $\Lambda_o$, modulations varying --.

Column 6,
Line 10, after "pumping source" change ";" to -- , --.
Line 28, after "$\Delta\beta$" change "maybe" to -- may be --.
Line 32, change "$2\pi/\Lambda_o \pm 2\pi i/\Lambda_{ph}$" to -- $2\pi/\Lambda_o + 2\pi i/\Lambda_{ph}$ --.
Line 33, after "$|m|\neq|n|$." insert -- ) --.

Column 7,
Lines 14, 27 and 40, before "illustrates" insert -- which --.

Column 8,
Lines 15 and 27, before "illustrates" insert -- which --.
Line 49, after "used in the" change "instant" to -- present --.
Line 59, before "of example" change "byway" to -- by way --.

Column 9,
Lines 1-2, change "to the outgoing light with the" to -- the outgoing light to --.
Line 22, after "(FIG. 4A)" insert -- . --.

UNITED STATES PATENT AND TRADEMARK OFFICE
CERTIFICATE OF CORRECTION

PATENT NO. : 6,806,986 B2
APPLICATION NO. : 10/456073
DATED : October 19, 2004
INVENTOR(S) : Asobe et al.

It is certified that error appears in the above-identified patent and that said Letters Patent is hereby corrected as shown below:

Column 9 (cont'd),
Line 23, change "that" to -- That --.
Lines 30-31, after "multiplexer 47" insert -- , --.
Line 31, after "wavelength $\lambda_2$" insert -- , --.
Line 32, after "signal light" change "43 by" to -- 43. This is due to --.

Column 10,
Line 6, before "varying the frequency" change "with" to -- by --.
Line 18, before "j-th peak," insert -- the --.
Line 25, after "numbers," change "discovers" to -- have found --.
Line 46, after "FIG. 3D," change "with" to -- while --.
Line 64, after "a first method" change "determines" to -- is determined --.
Line 67, after "A second method" change "determines" to -- is determined --.

Column 11,
Line 4, before "such that the conversion" change "determines" to -- is determined --.
Line 27, after "phase matching curve" change "becomes" to -- become --.
Line 59, before "difference frequency light." insert -- a --.
Line 65, before "illustrates spectra" insert -- which --.

Column 12,
Line 19, after "pattern is repeated" insert -- over --.
Line 39, after "polarization" change "are" to -- is --.

Column 13,
Line 20, after "is a graph" insert -- which --.
Line 48, after "pattern is repeated" insert -- over --.
Line 66, change "eliminates the even order peaks." to -- the even order peaks are eliminated. --.

Column 14,
Line 44, before "illustrates spectra" insert -- which --.
Line 49, before "the wavelength converter" change "competence," to -- feature of the present invention, --.
Line 57, before "zero order peak" insert -- the --.
Line 66, after "pattern is repeated" insert -- over --.

Column 16,
Line 34, after "pattern is repeated" insert -- over --.

UNITED STATES PATENT AND TRADEMARK OFFICE
CERTIFICATE OF CORRECTION

PATENT NO. : 6,806,986 B2
APPLICATION NO. : 10/456073
DATED : October 19, 2004
INVENTOR(S) : Asobe et al.

It is certified that error appears in the above-identified patent and that said Letters Patent is hereby corrected as shown below:

Column 17,
Line 4, after "amplifier 104 to be" change "outputs" to -- output --.
Line 11, after "five pump" change "wavelengths as the" to -- wavelengths, as in --.
Line 39, before "oxide crystals like KTP," insert -- , --.
Line 41, after "linear optical" change "coefficient" to -- coefficients --.

Column 18,
Line 9, before "nonlinear optical" insert -- the --.
Line 19, after "idler light" change "14" to -- 114 --.
Line 38, after "exhibits that" insert -- , --.
Line 56, after "structure in which" insert -- the --.
Line 63, change "much losing the" to -- losing much of the --.

Column 19,
Line 10, before "nonlinear medium" remove "a".

Column 20,
Line 18, before "illustrates spectra of" insert -- which --.
Line 33, after "pattern is repeated" insert -- over --.
Line 54, after "the polarization" change "are" to -- is --.

Column 21,
Line 35, before "illustrates spectra" insert -- which --.
Line 60, after "pattern is repeated" insert -- over --.
Line 61, change "periods Accordingly," to -- periods. Accordingly, --.

Column 22,
Line 11, change "eliminates the even order peaks." to -- the even order peaks are eliminated. --.
Line 54, before "illustrates spectra" insert -- which --.
Line 59, change "competence," to -- feature of the present invention, --.
Line 67, before "zero order peak" insert -- the --.

Column 23,
Line 8, after "pattern is repeated" insert -- over --.
Line 39, after "can implement" change "the" to -- a --.

Column 24,
Line 41, after "is repeated" insert -- over --.

UNITED STATES PATENT AND TRADEMARK OFFICE
CERTIFICATE OF CORRECTION

PATENT NO. : 6,806,986 B2
APPLICATION NO. : 10/456073
DATED : October 19, 2004
INVENTOR(S) : Asobe et al.

It is certified that error appears in the above-identified patent and that said Letters Patent is hereby corrected as shown below:

Column 25,
Line 11, after "amplifier 184 to be" change "outputs" to -- output --.
Line 18, change "wavelengths as the" to -- wavelengths, as in the --.
Line 47, before "oxide crystals like KTP," insert -- , --.
Line 49, after "linear optical" change "coefficient" to -- coefficients --.
Line 60, before "the difference frequency" change "of" to -- as --.
Line 62, after "wavelength converter" change "receive" to -- receives --.

Column 26,
Line 14, after "wavelength" change "$\mu_3$" to -- $\lambda_3$ --.
Line 42, change "$\lambda_1=\mu_2$," to -- $\lambda_1=\lambda_2$, --.

Column 28,
Line 40, after "$\lambda_1, \lambda_2$ and" change "$\mu_3$" to -- $\lambda_3$ --.

This certificate supersedes Certificate of Correction issued December 6, 2005.

Signed and Sealed this

Tenth Day of October, 2006

JON W. DUDAS
*Director of the United States Patent and Trademark Office*